United States Patent
Islam et al.

(10) Patent No.: US 10,447,444 B2
(45) Date of Patent: Oct. 15, 2019

(54) DYNAMIC SOUNDING REFERENCE SIGNAL SCHEDULING

(71) Applicant: QUALCOMM Incorporated, San Diego, CA (US)

(72) Inventors: Muhammad Nazmul Islam, Edison, NJ (US); Sundar Subramanian, Bridgewater, NJ (US); Tao Luo, San Diego, CA (US); Juergen Cezanne, Ocean Township, NJ (US); Bilal Sadiq, Basking Ridge, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 229 days.

(21) Appl. No.: 15/357,791

(22) Filed: Nov. 21, 2016

(65) Prior Publication Data

US 2017/0288832 A1    Oct. 5, 2017

Related U.S. Application Data

(60) Provisional application No. 62/318,190, filed on Apr. 4, 2016, provisional application No. 62/325,948, filed
(Continued)

(51) Int. Cl.
*H04L 5/00*     (2006.01)
*H04W 52/36*    (2009.01)
(Continued)

(52) U.S. Cl.
CPC .......... *H04L 5/0048* (2013.01); *H04W 52/36* (2013.01); *H04W 72/04* (2013.01); *H04W 88/02* (2013.01); *H04W 88/08* (2013.01)

(58) Field of Classification Search
CPC ... H04L 5/0023; H04L 5/0048; H04L 5/0005; H04W 52/36; H04W 72/04; H04W 88/08; H04W 88/02
See application file for complete search history.

(56) References Cited

U.S. PATENT DOCUMENTS 8,849,292 B2    9/2014   Tiirola et al.
9,270,433 B2    2/2016   Chen et al.
(Continued)

FOREIGN PATENT DOCUMENTS

WO    WO-2013109049 A1    7/2013

OTHER PUBLICATIONS

3GPP, "3rd Generation Partnership Project; Technical Specification Group Radio Access Network; Evolved Universal Terrestrial Radio Access (E-UTRA); Physical Layer Procedures (Release 10)," 3GPP Technical Specification, Jun. 2015, 128 pgs, 3GPP TS 36.213, V10.13.0, XP051294250, 3rd Generation Partnership Project, Sophia-Antipolis Valbonne, France.
(Continued)

*Primary Examiner* — Vinncelas Louis
(74) *Attorney, Agent, or Firm* — Holland & Hart LLP

(57) ABSTRACT

Methods, systems, and devices for wireless communication are described. A base station may identify a sounding reference signal (SRS) configuration for user equipment (UE). The base station may transmit an SRS grant message to a UE indicating the SRS configuration. An indication of SRS parameters may be included in the SRS grant message, and may include the SRS parameters or a location of the SRS parameters. That is, SRS parameters may be transmitted in a control channel with the SRS grant message or may be separately sent in a data channel as indicated by the indication of SRS parameters. In some cases, SRS parameters may be determined based on previously received UE
(Continued)

feedback regarding channel conditions or power limitations. Alternatively, the base station may make its own environment measurements or assign SRS parameters autonomously. The UE may signal SRS transmissions to the base station according to the SRS grant message.

29 Claims, 24 Drawing Sheets

Related U.S. Application Data on Apr. 21, 2016, provisional application No. 62/337,329, filed on May 16, 2016, provisional application No. 62/351,285, filed on Jun. 16, 2016, provisional application No. 62/353,493, filed on Jun. 22, 2016.

(51) Int. Cl.
　　*H04W 72/04*　　(2009.01)
　　*H04W 88/02*　　(2009.01)
　　*H04W 88/08*　　(2009.01)

(56) References Cited

U.S. PATENT DOCUMENTS

| | | | |
|---|---|---|---|
| 9,386,570 | B2 | 7/2016 | Kim et al. |
| 2009/0109908 | A1 | 4/2009 | Bertrand et al. |
| 2011/0142095 | A1 | 6/2011 | Guo et al. |
| 2011/0170497 | A1* | 7/2011 | Lin .............. H04L 5/0023 370/329 |
| 2011/0268028 | A1 | 11/2011 | Stern-Berkowitz et al. |
| 2011/0294529 | A1 | 12/2011 | Luo et al. |
| 2012/0039273 | A1* | 2/2012 | Nam .............. H04L 5/0005 370/329 |
| 2012/0281604 | A1* | 11/2012 | Papasakellariou .... H04L 5/0048 370/310 |
| 2012/0320859 | A1 | 12/2012 | Ahn et al. |
| 2013/0028134 | A1 | 1/2013 | Wang et al. |
| 2013/0078913 | A1 | 3/2013 | Lee et al. |
| 2017/0048039 | A1* | 2/2017 | Zhao .............. H04L 5/0048 |
| 2017/0288833 | A1 | 10/2017 | Islam et al. |

OTHER PUBLICATIONS

Catt, "Clarification on Timing of Aperiodic SRS," 3GPP TSG RAN WG1 Meeting #64, R1-111150, Taipei, Feb. 21-25, 2011, 4 pgs., XP050490869, 3rd Generation Partnership Project.

Freescale Semiconductor, "SRS Bandwidth and Starting Point Signaling," 3GPP TSG-RAN WG1 Meeting #52bis, R1-081332, Shenzhen, China, Mar. 31-Apr. 4, 2008, 2 pgs., XP050109758, 3rd Generation Partnership Project.

Huawei et al., "Further Details on SRS Transmission for eLAA", 3GPP TSG RAN WG1 Meeting #84bis, R1-162101, Busan, Korea, Apr. 11-15, 2016, 6 pgs., XP051079948, 3rd Generation Partnership Project.

ISA/EP, International Search Report and Written Opinion of the International Searching Authority, Int'l Application No. PCT/US2017/020952, Oct. 27, 2017, European Patent Office, Rijswijk, NL, 21 pgs.

Nokia Siemens Networks et al., "Details of Dynamic Aperiodic SRS," 3GPP TSG RAN WG1 Meeting #62bis, R1-105543, Xi'an, P.R. China, Oct. 11-15, 2010, 3 pgs., XP050598749, 3rd Generation Partnership Project.

NTT Docomo, "Views on Signaling for Dynamic Aperiodic SRS," 3GPP TSG RAN WG1 Meeting #62bis, R1-105439, Xian, China, Oct. 11-15, 2010, 7 pgs., XP050450740, 3rd Generation Partnership Project.

ISA/EPO, Partial International Search Report of the International Searching Authority, Int'l. App. No. PCT/US2017/020952, dated Jun. 16, 2017, European Patent Office, Rijswijk, NL, 13 pgs.

Samsung, "Remaining Aspects for Aperiodic SRS Triggering," 3GPP TSG RAN WG1 Meeting #65, R1-111460, Barcelona, Spain, May 9-13, 2011, 3 pgs., XP050491380, 3rd Generation Partnership Project.

Texas Instruments, "Design Considerations for Aperiodic SRS," 3GPP TSG RAN WG1 Meeting #60bis, R1-102110, Beijing, China, Apr. 12-16, 2010, 5 pgs., XP050419426, 3rd Generation Partnership Project.

\* cited by examiner

DYNAMIC SOUNDING REFERENCE SIGNAL SCHEDULING

CROSS REFERENCES

The present application for patent claims priority to U.S. Provisional Patent Application No. 62/318,190 by Islam, et al., entitled "Dynamic Sounding Reference Signal Scheduling," filed Apr. 4, 2016, and to U.S. Provisional Patent Application No. 62/325,948 by Islam, et al., entitled "Dynamic Sounding Reference Signal Scheduling" filed Apr. 21, 2016, and to U.S. Provisional Patent Application No. 62/337,329 by Islam, et al., entitled "Dynamic Sounding Reference Signal Scheduling" filed May 16, 2016 and to U.S. Provisional Patent Application No. 62/351,285 by Islam, et al., entitled "Dynamic Sounding Reference Signal Scheduling" filed Jun. 16, 2016 and to U.S. Provisional Patent Application No. 62/353,493 by Islam, et al., entitled "Dynamic Sounding Reference Signal Scheduling" filed Jun. 22, 2016, assigned to the assignee hereof, and each of which is expressly incorporated by reference herein.

BACKGROUND

The following relates generally to wireless communication, and more specifically to dynamic sounding reference signal scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communications systems, transmissions from the UE may be beamformed. Thus, uplink control channels may be received at a base station in a directional manner from multiple UEs.

Communications between a UE and a base station may include the use of sounding reference signals (SRSs). In some instances, an SRS may be used for wireless channel estimation. Channel estimates may be used to demodulate and decode subsequent data portions following the SRS. It may be desirable to adjust SRS parameters for SRS transmissions based on conditions of a communications environment and/or changes in the necessary scheduling of UEs (e.g., a changing number of UEs to be served by a base station). However, SRS transmission parameters may be pre-configured by an upper layer (e.g., a radio resource control (RRC) layer). The configuration of SRS transmission parameters by upper layers may result in costly adjustment of SRS parameters.

SUMMARY

The described techniques relate to improved methods, systems, devices, or apparatuses that support dynamic sounding reference signal scheduling. A base station may identify a sounding reference signal (SRS) configuration for a user equipment (UE). The base station may transmit an SRS grant message to a UE indicating the SRS configuration. An indication of SRS parameters may be included in the SRS grant message and may indicate the SRS parameters or a location of the SRS parameters. That is, SRS parameters may be transmitted in a control channel with the SRS grant message or may be separately sent in a data channel as indicated by the indication of SRS parameters. In some cases, SRS parameters may be determined based on previously received UE feedback regarding channel conditions or power limitations. Alternatively, the base station may make its own environment measurements or assign the SRS parameters autonomously. The UE may signal SRS transmissions to the base station according to the SRS grant message.

A method of wireless communication is described. The method may include receiving, at a user equipment (UE), a sounding reference signal (SRS) grant message from a base station, the SRS grant message based at least in part on an identified SRS configuration, the SRS grant message comprising an indication of SRS parameters, receiving, at the UE, downlink control information (DCI), wherein information in the DCI contradicts the indication of SRS parameters in the SRS grant message, determining to ignore information received at the UE based at least in part on the SRS grant message and the DCI, and transmitting, to the base station, one or more SRS transmissions based at least in part on the determination.

The described techniques relate to improved methods, systems, devices, or apparatuses that support dynamic sounding reference signal scheduling. A base station may identify a sounding reference signal (SRS) configuration for a user equipment (UE). The base station may transmit an SRS grant message to a UE indicating the SRS configuration. An indication of SRS parameters may be included in the SRS grant message and may indicate the SRS parameters or a location of the SRS parameters. That is, SRS parameters may be transmitted in a control channel with the SRS grant message or may be separately sent in a data channel as indicated by the indication of SRS parameters. In some cases, SRS parameters may be determined based on previously received UE feedback regarding channel conditions or power limitations. Alternatively, the base station may make its own environment measurements or assign the SRS parameters autonomously. The UE may signal SRS transmissions to the base station according to the SRS grant message.

A method of wireless communication is described. The method may include identifying a sounding reference signal (SRS) configuration for a user equipment (UE), transmitting an SRS grant message to the UE, the SRS grant message based at least in part on the SRS configuration for the UE and comprising an indication of SRS parameters and receiving, from the UE, one or more SRS transmissions according to the SRS grant message.

An apparatus for wireless communication is described. The apparatus may include means for identifying an SRS configuration for a UE, means for transmitting an SRS grant message to the UE, the SRS grant message based at least in part on the SRS configuration for the UE and comprising an indication of SRS parameters and means for receiving, from the UE, one or more SRS transmissions according to the SRS grant message.

A further apparatus is described. The apparatus may include a processor, memory in electronic communication with the processor, and instructions stored in the memory. The instructions may be operable to cause the processor to identify an SRS configuration for a UE, transmit an SRS grant message to the UE, the SRS grant message based at least in part on the SRS configuration for the UE and comprising an indication of SRS parameters and receive, from the UE, one or more SRS transmissions according to the SRS grant message.

A non-transitory computer readable medium for wireless communication is described. The non-transitory computer-readable medium may include instructions to cause a processor to identify an SRS configuration for a UE, transmit an SRS grant message to the UE, the SRS grant message based on the SRS configuration for the UE and comprising an indication of SRS parameters and receive, from the UE, one or more SRS transmissions according to the SRS grant message.

Some examples of the method, apparatus, or non-transitory computer-readable medium described above may further include processes, features, means, or instructions for transmitting the indication of the SRS parameters in the SRS grant message that comprises a set of SRS transmission parameters associated with the SRS transmissions from the UE. Some examples of the method, apparatus, or non-transitory computer-readable medium described above may further include processes, features, means, or instructions for transmitting the indication of the SRS parameters in the SRS grant message that comprises a location pointer associated with a set of SRS transmission parameters associated with the SRS transmissions from the UE.

In some examples of the method, apparatus, or non-transitory computer-readable medium described above, the location pointer provides an indication of a shared data channel that comprises the set of SRS transmission parameters. In some examples of the method, apparatus, or non-transitory computer-readable medium described above, the shared data channel comprises a physical downlink shared channel (PDSCH).

In some examples of the method, apparatus, or non-transitory computer-readable medium described above, the SRS grant message is transmitted on a control channel. In some examples of the method, apparatus, or non-transitory computer-readable medium described above, the control channel comprises a physical downlink control channel (PDCCH).

In some examples of the method, apparatus, or non-transitory computer-readable medium described above, the SRS parameters comprises one or more of a repetition parameter associated with the SRS transmissions, a starting position pointer associated with the SRS transmissions, an occupied bandwidth parameter associated with the SRS transmissions, a symbol index value associated with the SRS transmissions, an UE antenna port indication associated with the SRS transmissions, an UE antenna subarray indication associated with the SRS transmissions, a UE beam indication associated with the SRS transmissions, a cyclic shift parameter associated with the SRS transmissions, a comb offset parameter associated with the SRS transmissions, or combinations thereof.

In some examples of the method, apparatus, or non-transitory computer-readable medium described above, the SRS parameters comprises a timing component associated with the SRS transmissions. The timing component may include a symbol location of the subframe associated with SRS transmissions. The timing component may include a subframe index associated with the subframe index. In some aspects, the same timing component may be used to find a subframe index associated with a PUSCH transmission and may be received in an uplink grant. In some other aspects, the same timing component can be used to find a subframe index associated with a PUCCH transmission and may be received in a downlink grant.

In some examples of the method, apparatus, or non-transitory computer-readable medium described above, identifying the SRS configuration for the UE comprises: identifying one or more transmission parameters associated with the UE. Some examples of the method, apparatus, or non-transitory computer-readable medium described above may further include processes, features, means, or instructions for identifying the SRS configuration for the UE based on the transmission parameters. In some examples of the method, apparatus, or non-transitory computer-readable medium described above, the transmission parameters comprises one or more of a channel condition parameter, a traffic type parameter, a data load indicator, a communication channel parameter, or combinations thereof.

A method of wireless communication is described. The method may include receiving, at a user equipment (UE), a sounding reference signal (SRS) grant message from a base station, the SRS grant message based at least in part on an identified SRS configuration, the SRS grant message comprising an indication of SRS parameters and transmitting, to the base station, one or more SRS transmissions according to the SRS grant message.

An apparatus for wireless communication is described. The apparatus may include means for receiving, at a user equipment (UE), a sounding reference signal (SRS) grant message from a base station, the SRS grant message based at least in part on an identified SRS configuration, the SRS grant message comprising an indication of SRS parameters and means for transmitting, to the base station, one or more SRS transmissions according to the SRS grant message.

A further apparatus is described. The apparatus may include a processor, memory in electronic communication with the processor, and instructions stored in the memory. The instructions may be operable to cause the processor to receive, at a user equipment (UE), a sounding reference signal (SRS) grant message from a base station, the SRS grant message based at least in part on an identified SRS configuration, the SRS grant message comprising an indication of SRS parameters and transmit, to the base station, one or more SRS transmissions according to the SRS grant message.

A non-transitory computer readable medium for wireless communication is described. The non-transitory computer-readable medium may include instructions to cause a processor to receive, at a user equipment (UE), a sounding reference signal (SRS) grant message from a base station, the SRS grant message based on an identified SRS configuration, the SRS grant message comprising an indication of SRS parameters and transmit, to the base station, one or more SRS transmissions according to the SRS grant message.

Some examples of the method, apparatus, or non-transitory computer-readable medium described above may further include processes, features, means, or instructions for receiving the indication of the SRS parameters in the SRS grant message that comprises a set of SRS transmission parameters associated with the SRS transmissions from the UE.

Some examples of the method, apparatus, or non-transitory computer-readable medium described above may further include processes, features, means, or instructions for receiving the indication of the SRS parameters in the SRS grant message that comprises a location pointer associated with a set of SRS transmission parameters associated with the SRS transmissions from the UE.

In some examples of the method, apparatus, or non-transitory computer-readable medium described above, the location pointer provides an indication of a shared data channel that comprises the set of SRS transmission parameters. In some examples of the method, apparatus, or non-transitory computer-readable medium described above, the shared data channel comprises a physical downlink shared channel (PDSCH).

In some examples of the method, apparatus, or non-transitory computer-readable medium described above, the SRS grant message is received on a control channel. In some examples of the method, apparatus, or non-transitory computer-readable medium described above, the control channel comprises a physical downlink control channel (PDCCH).

In some examples of the method, apparatus, or non-transitory computer-readable medium described above, the SRS parameters comprises one or more of a repetition parameter associated with the SRS transmissions, a starting position pointer associated with the SRS transmissions, an occupied bandwidth parameter associated with the SRS transmissions, a symbol index value associated with the SRS transmissions, an UE antenna port indication associated with the SRS transmissions, an UE antenna subarray indication associated with the SRS transmissions, a UE beam indication associated with the SRS transmissions, a cyclic shift parameter associated with the SRS transmissions, a comb offset parameter associated with the SRS transmissions, or combinations thereof.

In some examples of the method, apparatus, or non-transitory computer-readable medium described above, the SRS parameters comprise a timing component associated with the SRS transmissions. In some examples of the method, apparatus, or non-transitory computer-readable medium described above, the timing component comprises a symbol location associated with a subframe for the SRS transmissions.

In some examples of the method, apparatus, or non-transitory computer-readable medium described above, the timing component comprises a subframe index associated with the SRS transmissions. In some examples of the method, apparatus, or non-transitory computer-readable medium described above, the timing component further comprises an uplink subframe index associated with a physical uplink shared channel (PUSCH) transmission.

In some examples of the method, apparatus, or non-transitory computer-readable medium described above, the timing component is received in an uplink grant. In some examples of the method, apparatus, or non-transitory computer-readable medium described above, the timing component further comprises an uplink subframe index associated with a physical uplink control channel (PUCCH) transmission.

In some examples of the method, apparatus, or non-transitory computer-readable medium described above, the timing component is received in a downlink grant. In some examples of the method, apparatus, or non-transitory computer-readable medium described above, the identified SRS configuration for the UE comprises an identification of one or more transmission parameters associated with the UE, and an identification of the SRS configuration for the UE based on the transmission parameters. In some examples of the method, apparatus, or non-transitory computer-readable medium described above, the transmission parameters comprises one or more of a channel condition parameter, a traffic type parameter, a data load indicator, a communication channel parameter, or combinations thereof.

Some examples of the method, apparatus, or non-transitory computer-readable medium described above may further include processes, features, means, or instructions for receiving a DCI in a first subframe after receiving the SRS grant message in a second subframe, wherein information transmitted in the DCI contradicts the indication of SRS parameters in the SRS grant message.

Some examples of the method, apparatus, or non-transitory computer-readable medium described above may further include processes, features, means, or instructions for receiving a DCI in a first subframe before receiving the SRS grant message in a second subframe, wherein information transmitted in the DCI contradicts the indication of SRS parameters in the SRS grant message.

Some examples of the method, apparatus, or non-transitory computer-readable medium described above may further include processes, features, means, or instructions for determining to ignore all information transmitted in the DCI received in the first subframe and all information transmitted in a DCI received in the second subframe.

Some examples of the method, apparatus, or non-transitory computer-readable medium described above may further include processes, features, means, or instructions for transmitting an SRS message according to the indication of SRS parameters, and determining to ignore information transmitted in the DCI.

Some examples of the method, apparatus, or non-transitory computer-readable medium described above may further include processes, features, means, or instructions for determining to ignore the indication of SRS parameters, and transmitting according to information transmitted in the DCI.

In some examples of the method, apparatus, or non-transitory computer-readable medium described above, the SRS grant message was received in a DCI in a second subframe that is before a first subframe, and the method, apparatus, or non-transitory computer-readable medium described above may further include processes, features, means, or instructions for determining to ignore all information transmitted in the DCI received in the second subframe, and transmitting according to information transmitted in the DCI received in the first subframe.

In some examples of the method, apparatus, or non-transitory computer-readable medium described above, the SRS grant message was received in a DCI in a second subframe that is after a first subframe, and the method, apparatus, or non-transitory computer-readable medium described above may further include processes, features, means, or instructions for determining to ignore all information transmitted in the DCI received in the second subframe, and transmitting according to information transmitted in the DCI received in the first subframe.

In some examples of the method, apparatus, or non-transitory computer-readable medium described above, the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a UE antenna port indication associated with the one or more SRS transmissions, a cyclic shift parameter associated with the one or more SRS transmissions, a comb offset parameter associated with the one or more SRS transmissions, or a combination thereof.

Some examples of the method, apparatus, or non-transitory computer-readable medium described above may further include processes, features, means, or instructions for receiving a first downlink control information (DCI) in a first subframe and the SRS grant message in a second DCI of the first subframe, wherein information transmitted in the first DCI contradicts the indication of SRS parameters in the SRS grant message.

Some examples of the method, apparatus, or non-transitory computer-readable medium described above may further include processes, features, means, or instructions for determining to ignore all information transmitted in the first DCI and all information transmitted in a second DCI received in the first subframe.

Some examples of the method, apparatus, or non-transitory computer-readable medium described above may further include processes, features, means, or instructions for transmitting an SRS message according to the indication of SRS parameters, and determining to ignore information transmitted in the first DCI.

Some examples of the method, apparatus, or non-transitory computer-readable medium described above may further include processes, features, means, or instructions for determining to ignore the indication of SRS parameters, and transmitting according to information transmitted in the first DCI.

In some examples of the method, apparatus, or non-transitory computer-readable medium described above, the SRS grant message was received in a second DCI in the first subframe, and the method, apparatus, or non-transitory computer-readable medium described above may further include processes, features, means, or instructions for determining to ignore all information transmitted in the second DCI, and transmitting according to information transmitted in the first DCI.

In some examples of the method, apparatus, or non-transitory computer-readable medium described above, the information transmitted in the first DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

A method of wireless communication is described. The method may include receiving, at a user equipment (UE), a sounding reference signal (SRS) grant message from a base station, the SRS grant message based at least in part on an identified SRS configuration, the SRS grant message comprising an indication of SRS parameters, receiving, at the UE, downlink control information (DCI), wherein information in the DCI contradicts the indication of SRS parameters in the SRS grant message, determining to ignore information received at the UE based at least in part on the SRS grant message and the DCI, and transmitting, to the base station, one or more SRS transmissions based at least in part on the determination.

An apparatus for wireless communication is described. The apparatus may include means for receiving, at a user equipment (UE), a sounding reference signal (SRS) grant message from a base station, the SRS grant message based at least in part on an identified SRS configuration, the SRS grant message comprising an indication of SRS parameters, means for receiving, at the UE, downlink control information (DCI), wherein information in the DCI contradicts the indication of SRS parameters in the SRS grant message, means for determining to ignore information received at the UE based at least in part on the SRS grant message and the DCI, and means for transmitting, to the base station, one or more SRS transmissions based at least in part on the determination.

Another apparatus for wireless communication is described. The apparatus may include a processor, memory in electronic communication with the processor, and instructions stored in the memory. The instructions may be operable to cause the processor to receive, at a user equipment (UE), a sounding reference signal (SRS) grant message from a base station, the SRS grant message based at least in part on an identified SRS configuration, the SRS grant message comprising an indication of SRS parameters, receive, at the UE, downlink control information (DCI), wherein information in the DCI contradicts the indication of SRS parameters in the SRS grant message, determine to ignore information received at the UE based at least in part on the SRS grant message and the DCI, and transmit, to the base station, one or more SRS transmissions based at least in part on the determination.

A non-transitory computer readable medium for wireless communication is described. The non-transitory computer-readable medium may include instructions operable to cause a processor to receive, at a user equipment (UE), a sounding reference signal (SRS) grant message from a base station, the SRS grant message based at least in part on an identified SRS configuration, the SRS grant message comprising an indication of SRS parameters, receive, at the UE, downlink control information (DCI), wherein information in the DCI contradicts the indication of SRS parameters in the SRS grant message, determine to ignore information received at the UE based at least in part on the SRS grant message and the DCI, and transmit, to the base station, one or more SRS transmissions based at least in part on the determination.

Some examples of the method, apparatus, and non-transitory computer-readable medium described above may further include processes, features, means, or instructions for comparing the SRS grant message and the DCI, wherein determining to ignore information comprises determining to ignore information transmitted in the DCI and information transmitted in the SRS grant message based at least in part on the comparison.

Some examples of the method, apparatus, and non-transitory computer-readable medium described above may further include processes, features, means, or instructions for comparing the SRS grant message and the DCI, wherein determining to ignore information comprises determining to ignore information transmitted in the DCI and follow information transmitted in the SRS grant message based at least in part on the comparison, and wherein transmitting one or more SRS transmissions comprises transmitting an SRS message according to the indication of SRS parameters.

Some examples of the method, apparatus, and non-transitory computer-readable medium described above may further include processes, features, means, or instructions for comparing the SRS grant message and the DCI, wherein determining to ignore information comprises determining to ignore information transmitted in the SRS grant message and follow information transmitted in the DCI based at least in part on the comparison, wherein transmitting one or more SRS transmissions comprises transmitting an SRS message according to the DCI.

In some examples of the method, apparatus, and non-transitory computer-readable medium described above, the DCI may be received in a subframe before the SRS grant message may be received.

In some examples of the method, apparatus, and non-transitory computer-readable medium described above, the DCI may be received in a subframe after the SRS grant message may be received.

In some examples of the method, apparatus, and non-transitory computer-readable medium described above, the DCI may be received in a same subframe as the SRS grant message.

In some examples of the method, apparatus, and non-transitory computer-readable medium described above, the SRS grant message may be received in a second DCI.

In some examples of the method, apparatus, and non-transitory computer-readable medium described above, the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

In some examples of the method, apparatus, and non-transitory computer-readable medium described above, the SRS parameters comprise one or more of a repetition parameter associated with the one or more SRS transmissions, a starting position pointer associated with the one or more SRS transmissions, an occupied bandwidth parameter associated with the one or more SRS transmissions, a symbol index value associated with the one or more SRS transmissions, an UE antenna port indication associated with the one or more SRS transmissions, an UE antenna subarray indication associated with the one or more SRS transmissions, a UE beam indication associated with the one or more SRS transmissions, a cyclic shift parameter associated with the one or more SRS transmissions, a comb offset parameter associated with the one or more SRS transmissions, or combinations thereof.

A method of wireless communication is described. The method may include identifying a sounding reference signal (SRS) configuration for a user equipment (UE), transmitting an SRS grant message to the UE, the SRS grant message based at least in part on the SRS configuration for the UE, the SRS grant message comprising an indication of SRS parameters, transmitting downlink control information (DCI), wherein information transmitted in the DCI contradicts the indication of SRS parameters in the SRS grant message, and receiving, from the UE, one or more SRS transmissions.

An apparatus for wireless communication is described. The apparatus may include means for identifying a sounding reference signal (SRS) configuration for a user equipment (UE), means for transmitting an SRS grant message to the UE, the SRS grant message based at least in part on the SRS configuration for the UE, the SRS grant message comprising an indication of SRS parameters, means for transmitting downlink control information (DCI), wherein information transmitted in the DCI contradicts the indication of SRS parameters in the SRS grant message, and means for receiving, from the UE, one or more SRS transmissions.

Another apparatus for wireless communication is described. The apparatus may include a processor, memory in electronic communication with the processor, and instructions stored in the memory. The instructions may be operable to cause the processor to identify a sounding reference signal (SRS) configuration for a user equipment (UE), transmit an SRS grant message to the UE, the SRS grant message based at least in part on the SRS configuration for the UE, the SRS grant message comprising an indication of SRS parameters, transmit downlink control information (DCI), wherein information transmitted in the DCI contradicts the indication of SRS parameters in the SRS grant message, and receive, from the UE, one or more SRS transmissions.

A non-transitory computer readable medium for wireless communication is described. The non-transitory computer-readable medium may include instructions operable to cause a processor to identify a sounding reference signal (SRS) configuration for a user equipment (UE), transmit an SRS grant message to the UE, the SRS grant message based at least in part on the SRS configuration for the UE, the SRS grant message comprising an indication of SRS parameters, transmit downlink control information (DCI), wherein information transmitted in the DCI contradicts the indication of SRS parameters in the SRS grant message, and receive, from the UE, one or more SRS transmissions.

In some examples of the method, apparatus, and non-transitory computer-readable medium described above, the DCI may be transmitted in a subframe before the SRS grant message may be transmitted.

In some examples of the method, apparatus, and non-transitory computer-readable medium described above, the DCI may be transmitted in a subframe after the SRS grant message may be transmitted.

In some examples of the method, apparatus, and non-transitory computer-readable medium described above, the DCI may be transmitted in a same subframe as the SRS grant message.

Some examples of the method, apparatus, and non-transitory computer-readable medium described above may further include processes, features, means, or instructions for receiving an SRS message according to the indication of SRS parameters in the SRS grant message.

Some examples of the method, apparatus, and non-transitory computer-readable medium described above may further include processes, features, means, or instructions for receiving an SRS message according to information transmitted in the DCI.

In some examples of the method, apparatus, and non-transitory computer-readable medium described above, the SRS grant message may be transmitted in a second DCI.

In some examples of the method, apparatus, and non-transitory computer-readable medium described above, the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

In some examples of the method, apparatus, and non-transitory computer-readable medium described above, the SRS parameters comprise one or more of a repetition parameter associated with the one or more SRS transmissions, a starting position pointer associated with the one or more SRS transmissions, an occupied bandwidth parameter associated with the one or more SRS transmissions, a symbol index value associated with the one or more SRS transmissions, an UE antenna port indication associated with the one or more SRS transmissions, an UE antenna subarray indication associated with the one or more SRS transmissions, a UE beam indication associated with the one or more SRS transmissions, a cyclic shift parameter associated with the one or more SRS transmissions, a comb offset parameter associated with the one or more SRS transmissions, or combinations.

DETAILED DESCRIPTION

Communications between a user equipment (UE) and a base station may include the use of sounding reference signals (SRSs). It may be desirable to adjust SRS parameters for SRS transmissions based on conditions of a communications environment and/or changes in the necessary scheduling of UEs (e.g., a changing number of UEs to be served by a base station). Dynamically configuring parameters for SRS transmission at the physical (PHY) layer may result in increased scheduling flexibility. An SRS indication may be dynamically signaled via a physical downlink control channel (PDCCH).

The SRS indication may include an SRS trigger and, in some cases, SRS parameters that are dynamically configured by the base station. The SRS indication may include more than one bit (e.g., N bits) to indicate SRS parameters, or to indicate where the SRS parameters are located. That is, the SRS trigger and SRS parameters may all be included in downlink control information (DCI) on the PDCCH or, alternatively, the SRS trigger and an indication of where to find SRS parameters (e.g., where outside of the PDCCH) may be sent on the PDCCH. SRS parameters may include SRS periodicity, subframe index, starting position, allotted resource (e.g., occupied bandwidth), cyclic shift, comb index, number of symbols, sub-arrays (e.g., beams of a beamforming scenario), etc. SRS parameters may be determined by a base station based on UE feedback or observed environment conditions at the base station.

Aspects of the disclosure are initially described in the context of a wireless communication system. Examples of dynamic SRS configurations and methods for implementing dynamic SRS configurations are then described. Aspects of the disclosure are further illustrated by and described with reference to apparatus diagrams, system diagrams, and flowcharts that relate to dynamic sounding reference signal scheduling.

Figure 1:
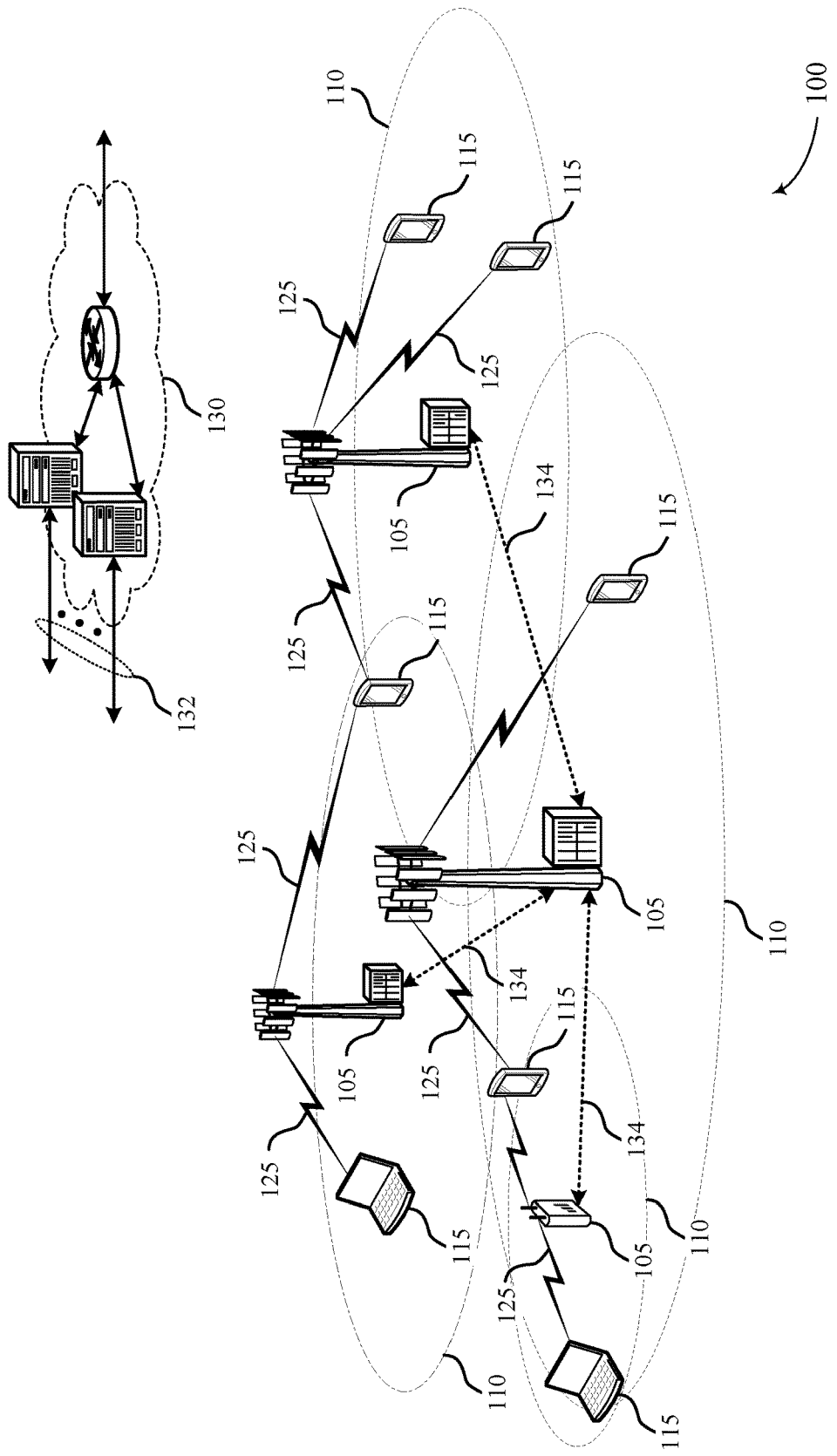
FIG. 1 illustrates an example of a wireless communications system that supports dynamic sounding reference signal scheduling in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

In some cases, an SRS may be used for wireless channel estimation. Channel estimates may be used to demodulate and decode subsequent data portions following the SRS. Conventionally, wireless communications system 100 may periodically or aperiodically schedule SRSs. For periodic SRS scheduling, SRS parameters may be sent via radio resource control (RRC) signaling. For aperiodic scheduling, SRS timing may be triggered via a PDCCH. The SRS timing may be indicated by a single bit on the physical (PHY) layer. A UE 115 may send SRS at a fixed time after receiving PDCCH using SRS parameters that are pre-configured by an upper layer (e.g., a higher layer).

In certain aspects, wireless communications system 100 may support dynamic scheduling for SRS transmissions. For example, a base station 105 may dynamically schedule SRS transmissions from a UE 115 and convey the SRS transmission parameters to the UE 115 via a PDCCH, in some examples. In other examples, base station 105 may convey a pointer to the SRS transmission parameters on the PDCCH and then convey the SRS transmission parameters on a PDSCH. SRS parameters may include SRS periodicity, subframe index, starting position, allotted resources, cyclic shift, comb index, etc. The base station 105 may identify or otherwise determine a SRS configuration for a UE 115, e.g., based on channel measurements, communication requirements (e.g., buffer status report (BSR) from the UE 115), etc. The base station 105 may determine SRS transmission parameters for the UE 115 and transmit a SRS grant message to the UE 115 on the PDCCH. The SRS grant message may include the SRS transmission parameters, or at least a pointer to the location of where the UE 115 may locate the SRS transmission parameters. The UE 115 may receive the SRS grant message, determine the SRS transmission parameters, and send SRS transmissions to the base station 105 according to the SRS grant message.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The SRS may be transmitted by UE 115 using a predetermined sequence (e.g., a Zadoff-Chu sequence) so that a base station 105 may estimate the UL channel quality. An SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 115.

In mmW systems, transmissions (e.g., SRS grants, SRS transmissions, etc.) may be beamformed to meet a certain link budget (e.g., an accounting of gains and losses associated with transmitters and receivers when communicating over a medium). In such cases, base stations 105 may use multiple antenna ports connected to subarrays of antennas to form the beams in various directions using a number of analog weight factors. A base station 105 may thus transmit in multiple directions, where the direction may change in each symbol of a subframe.

Figure 2:
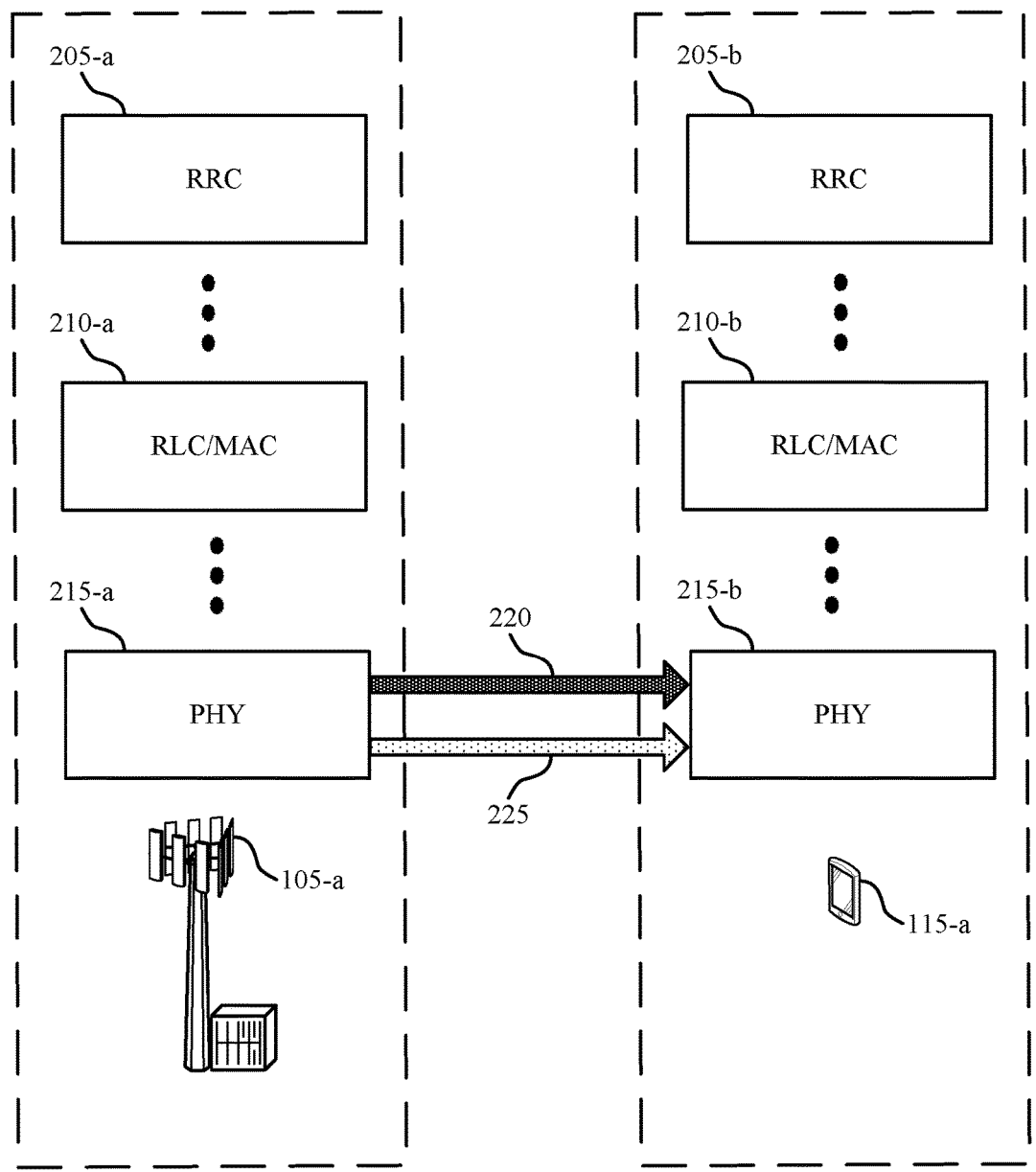
FIG. 2 illustrates an example of a wireless communications system that supports dynamic sounding reference signal scheduling in accordance with aspects of the present disclosure.

FIG. 2 illustrates an example of a wireless communications system 200 for dynamic sounding reference signal scheduling. Wireless communications system 200 may include base station 105-a and UE 115-a, which may be examples of the corresponding devices described with reference to FIG. 1. Wireless communications system 200 represents a system that supports dynamic SRS scheduling at the PHY layer (e.g., between PHY entities 215).

An SRS indication may be dynamically signaled via PDCCH 220 from PHY entity 215-a to PHY entity 215-b. The SRS indication may include an SRS trigger and, in some cases, SRS parameters that are dynamically configured by base station 105-a. In some cases, more than one symbol may be used for signaling an SRS indication. SRS resources may be scheduled dynamically. Further, SRS timing in PDCCH 220 may include N number of bits. UE 115-a may send SRSs in 2^N potential locations after receiving an SRS trigger via PDCCH 220.

The SRS indication may include more than one bit (e.g., N bits) to indicate SRS parameters, or to indicate where the SRS parameters are located. That is, the SRS trigger and SRS parameters may all be included in downlink control information (DCI) on the PDCCH 220 or, alternatively, the SRS trigger and an indication of where to find SRS parameters (e.g., where outside of the PDCCH) may be sent on the PDCCH. In the latter case, the SRS parameters may be sent over a physical downlink shared channel (PDSCH) 225. The indication of where SRS parameters are being sent may allow UE 115-a to know where to look for SRS parameters when decoding PDSCH 225. Greater scheduling flexibility may be achieved when dynamically indicating SRS parameters at the PHY layer versus pre-configuring SRS parameters at a high layer. That is, SRS parameters generated at an RRC entity 205 and passed through intermediate entities 210 to PHY entities 215 may result in reduced SRS scheduling flexibility.

SRS parameters may include SRS periodicity, subframe index, starting position, allotted resource (e.g., occupied bandwidth), cyclic shift, comb index, number of symbols, sub-arrays (e.g., beams of a beamforming scenario), etc. SRS parameters may be determined by base station 105-a based on UE feedback or environment conditions at base station 105-a. For example, the allotted resources or occupied bandwidth may depend on channel quality measurements or power limitation information sent from UE 115-a. Base station 105-a may use channel quality measurements from UE 115-a to adjust the allocated bandwidth to channels of high quality. Additionally or alternatively, base station 105-a may receive notification that UE 115-a is power limited, and may reduce the bandwidth so that UE 115-a may spread the limited power available over a smaller bandwidth. Other examples of factors for determining SRS parameters may include selecting sub-arrays or beams based on beam quality reports, cyclic shifts from knowledge of the number of UEs 115 to be served (e.g., other UEs 115 to be scheduled for SRS by the base station 105-a), comb index as a function of the chosen frequency resources used and the number of UEs 115 to be served, etc. In some cases, SRS parameters may be dynamically adjusted for each SRS trigger (e.g., SRS may use different resources in response to each SRS trigger).

Figure 3:
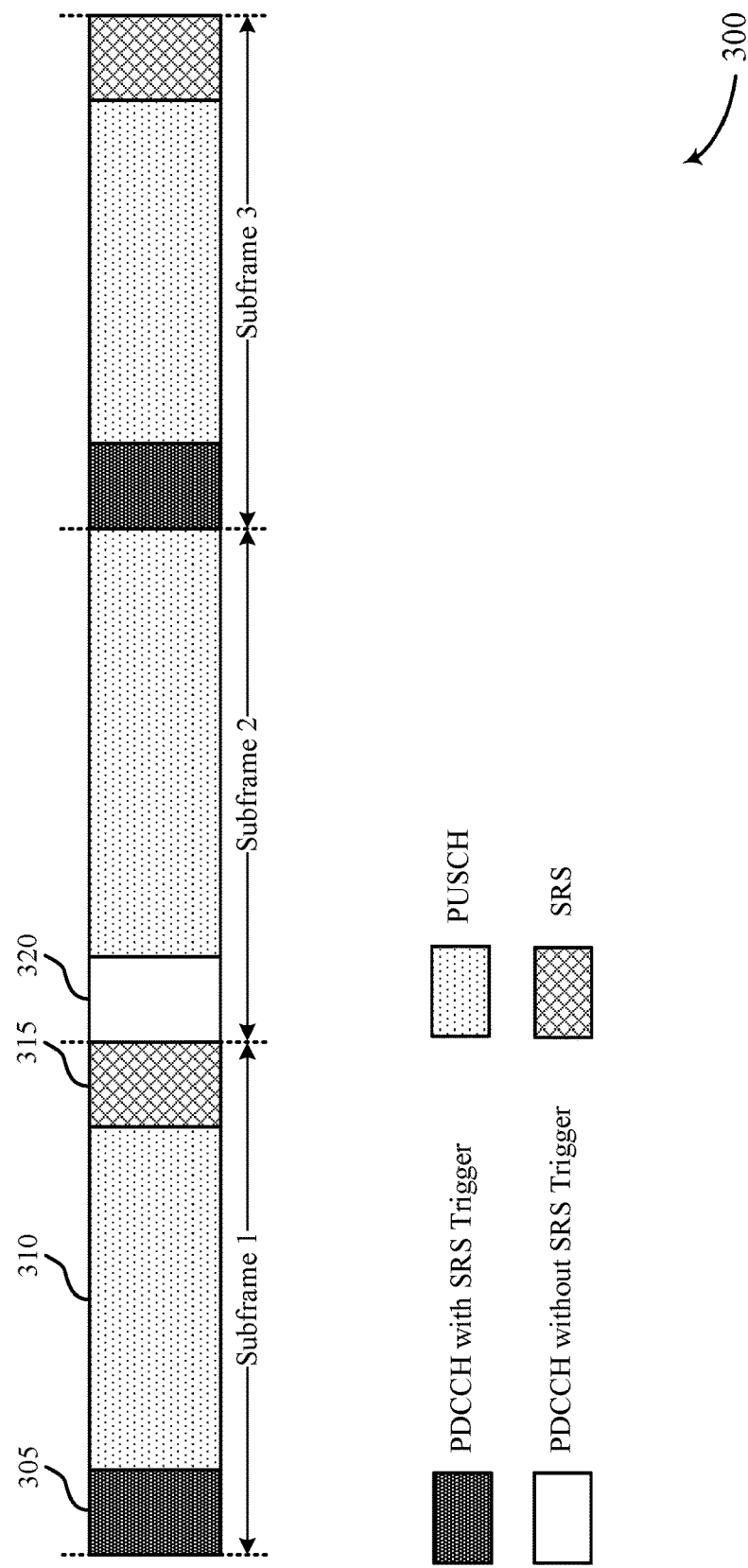
FIG. 3 illustrates an example of a dynamic sounding reference signal configuration that supports dynamic sounding reference signal scheduling in accordance with aspects of the present disclosure.

FIG. 3 illustrates an example of a dynamic SRS configuration 300 for dynamic sounding reference signal scheduling. In some cases, dynamic SRS configuration 300 may represent aspects of techniques performed by a UE 115 or base station 105 as described with reference to FIGS. 1-2.

Dynamic SRS configuration 300 illustrates an example of a series of subframes configured for dynamic SRS scheduling. Subframe 1 may begin with an SRS trigger 305 indicated in the PDCCH. The SRS trigger 305 may be followed by a data portion 310 transmitted via PUSCH. In some examples, SRS trigger 305 includes parameters for SRS transmission. Prior to the end of Subframe 1, an SRS 315 may be scheduled in response to the SRS trigger 305. The SRS 315 may be scheduled according to SRS transmission parameters indicated in SRS trigger 305.

Alternatively, Subframe 2 illustrates the scenario where the beginning of a subframe includes a blank control portion 320 (e.g., PDCCH without an SRS trigger). In this case, a data portion 310 may follow the blank control portion 320 and continue until the boundary of Subframe 3 as no SRS 315 is needed.

Figure 4:
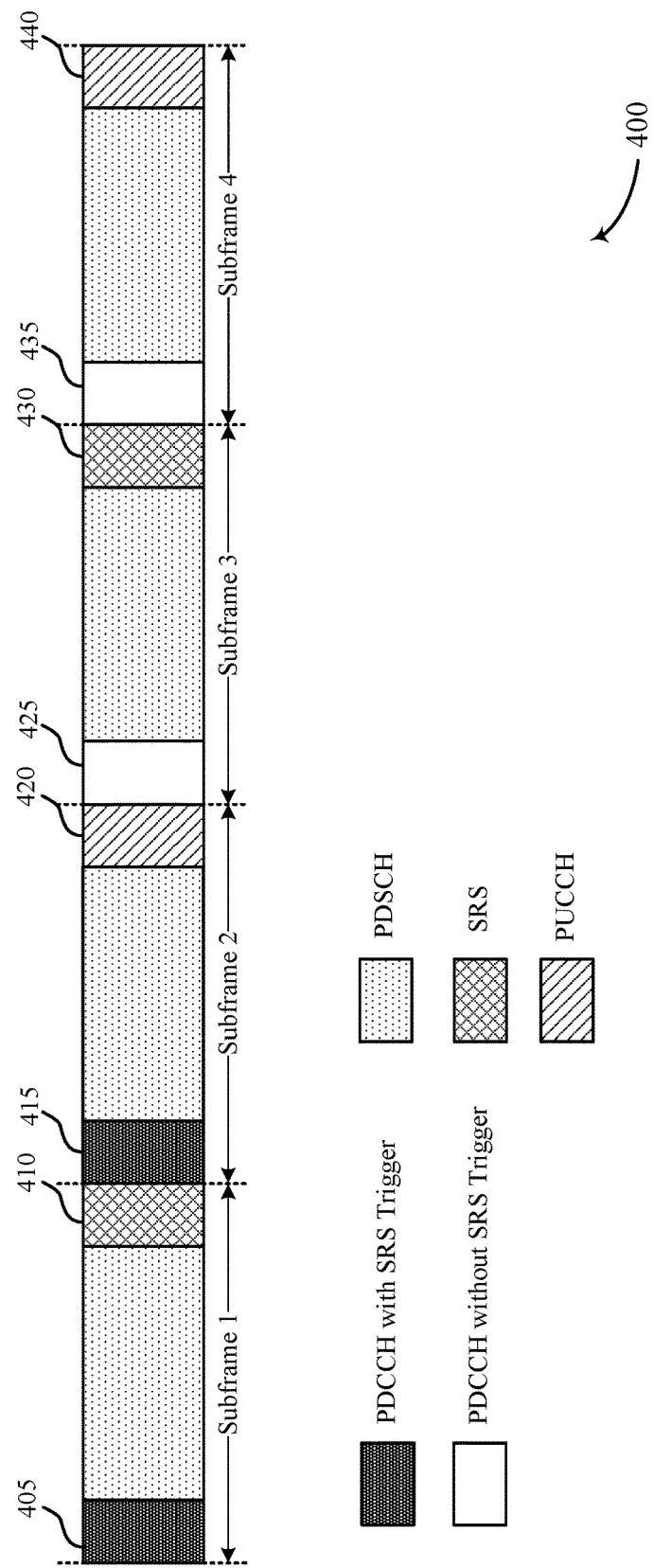
FIG. 4 illustrates an example of a dynamic sounding reference signal configuration that supports dynamic sounding reference signal scheduling in accordance with aspects of the present disclosure.

FIG. 4 illustrates an example of a dynamic SRS configuration 400 for dynamic sounding reference signal scheduling. In some cases, dynamic SRS configuration 400 may represent aspects of techniques performed by a UE 115 or base station 105 as described with reference to FIGS. 1-2.

Dynamic SRS configuration 400 illustrates an example of a series of subframes configured for dynamic SRS scheduling. In certain aspects, dynamic SRS configuration 400 may illustrate an example of including a timing component that is associated with the SRS transmissions, with PUSCH transmissions, with PUCCH transmissions, or combinations thereof. In some aspects, the timing component may include using bit(s) to convey aspects of the transmission schedules for the current subframe and, in some examples the certain of the following subframes, e.g., symbol locations for the respective transmissions. In some aspects, the timing component, e.g., the bit(s), may be included in a grant, e.g., an uplink grant when scheduling PUSCH transmissions, a downlink grant when scheduling PUCCH transmissions, etc.

In some aspects, dynamic SRS configuration 400 illustrates an example of scheduling a joint transmission time for SRS transmissions and PUCCH transmissions. For example, the SRS scheduling may include an SRS parameter (e.g., the timing component associated with SRS transmissions) that jointly denotes the subframe index of where SRS transmissions occur and where PUCCH transmissions occur. Similarly, the SRS scheduling may include an SRS parameter that jointly denotes the subframe index of where SRS transmission occur and where PUSCH transmissions occur.

In some aspects, a dynamic PUCCH configuration can be used to schedule a joint transmission time for PUCCH transmission and SRS transmission. For example, the PUCCH scheduling may include a transmission time parameter that jointly represents the subframe index of where SRS transmissions occur and where PUCCH transmissions occur.

In some aspects, a dynamic PUSCH configuration can be used to schedule a joint transmission time for PUSCH transmission and SRS transmission. For example, the PUSCH scheduling may include a transmission time parameter that jointly represents the subframe index where SRS transmissions occur and where PUSCH transmissions occur.

Subframe 1 may begin with an SRS trigger 405 indicated in the PDCCH. The SRS trigger 405 may include a subframe index bit, e.g., a first bit or bit 0. In some examples, the subframe index bit may convey an indication of SRS transmission(s), PUSCH transmission(s), PUCCH transmission(s), or combinations thereof. In the non-limiting example subframe 1, when the subframe index bit is "0", this may convey an indication that the SRS is transmitted in the current subframe and PUCCH is transmitted in the next subframe. Thus, in the example subframe 1 the subframe index bit may be "0" and the SRS trigger 405 may be followed by data transmitted via PDSCH and then SRS transmission 410. That is, SRS trigger 405 includes parameters for SRS transmission. Prior to the end of Subframe 1, an SRS transmission 410 may be scheduled in response to the SRS trigger 405. The SRS transmission 410 may be scheduled according to SRS transmission parameters indicated in SRS trigger 405, e.g., the subframe index bit being set to "0." Thus, the subframe index bit of SRS trigger 405 conveys a timing component that provides an indication of the schedule for PUCCH transmissions 420, and also SRS transmission 410 for subframes 1-2.

Subframe 2 may begin with an SRS trigger 415 indicated in the PDCCH. The SRS trigger 415 may also include a subframe index bit, e.g., a second bit or bit 1. In the non-limiting example of subframe 2, when the subframe index bit is set to "1," this may convey an indication that the SRS is transmitted in the next subframe (e.g., subframe 3) and PUCCH is transmitted in the subframe that follows the next subframe including the SRS transmission (e.g., subframes 4). Thus, the subframe index bit of SRS trigger 415 may be set to "1" and the SRS trigger 415 may be followed by data transmitted via PDSCH and then PUCCH transmission 420 at the end of subframe 2. In the next subframe, subframe 3 may include a blank control portion 425 (e.g., PDCCH without an SRS trigger), followed by data transmitted via PDSCH, and then SRS transmission 430 at the end of subframe 3. In the next subframe, subframe 4 may also include a blank control portion 435 (e.g., PDCCH without an SRS trigger), followed by data transmitted via PDSCH, and then PUCCH transmission 440 at the end of subframe 4. Thus, the subframe index bit of SRS trigger 415 conveys a timing component that provides an indication of the schedule for PUCCH transmissions 440, and also SRS transmission 430 for subframes 3-4.

Figure 5:
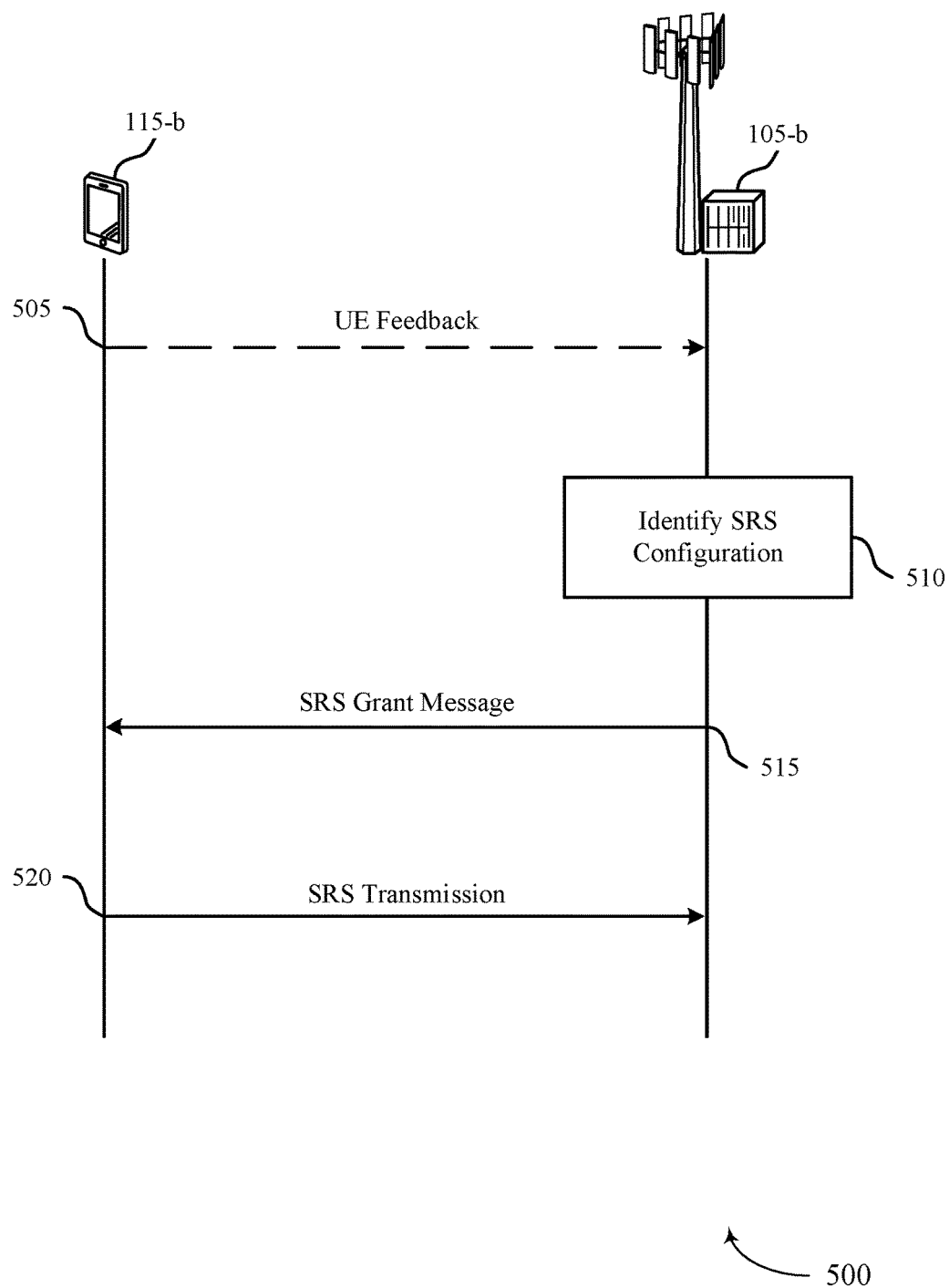
FIG. 5 illustrates an example of a process flow in a system that supports dynamic sounding reference signal scheduling in accordance with aspects of the present disclosure.

FIG. 5 illustrates an example of a process flow 500 for dynamic sounding reference signal scheduling in accordance with various aspects of the present disclosure. Process flow 500 may include base station 105-*b* and UE 115-*b*, which may be examples of the corresponding devices described with reference to FIG. 1-2.

In some examples, at step 505, UE 115-*b* may optionally send UE feedback to base station 105-*b*. At step 510, base station 105-*b* may identify an SRS configuration for UE 115-*b*. The SRS configuration may be based on transmission parameters associated with UE 115-*b*. The transmission parameters may include one or more of a channel condition parameter, a traffic type parameter, a data load indicator, and/or a communication channel parameter.

The SRS transmission parameters may include one or more of a timing component associated with the SRS transmissions, a repetition parameter associated with the SRS transmissions, a starting position pointer associated with the SRS transmissions, an occupied bandwidth parameter associated with the SRS transmissions, a symbol index value associated with the SRS transmissions, an UE antenna port indication associated with the SRS transmissions, an UE antenna subarray indication associated with the SRS transmissions, a UE beam indication associated with the SRS transmissions, a cyclic shift parameter associated with the SRS transmissions, and/or a comb offset parameter associated with the SRS transmissions.

At step 515, base station 105-*b* may transmit an SRS grant message to UE 115-*b*. The SRS grant message may include an indication of SRS parameters associated with SRS transmissions from UE 115-*b*. The indication of SRS parameters may include the SRS parameters or, alternatively, may include a location pointer to indicate where SRS parameters are being signaled (e.g., a location pointer to PDSCH, where PDSCH includes the SRS transmission parameters). In some cases, the SRS parameters may be determined from UE feedback sent to base station 105-*b* in step 505. The SRS grant message may be sent on a control channel (e.g., PDCCH). At step 520, UE 115-*b* may send SRS transmissions to base station 105-*b* according to the SRS grant message from step 515.

Figure 18:
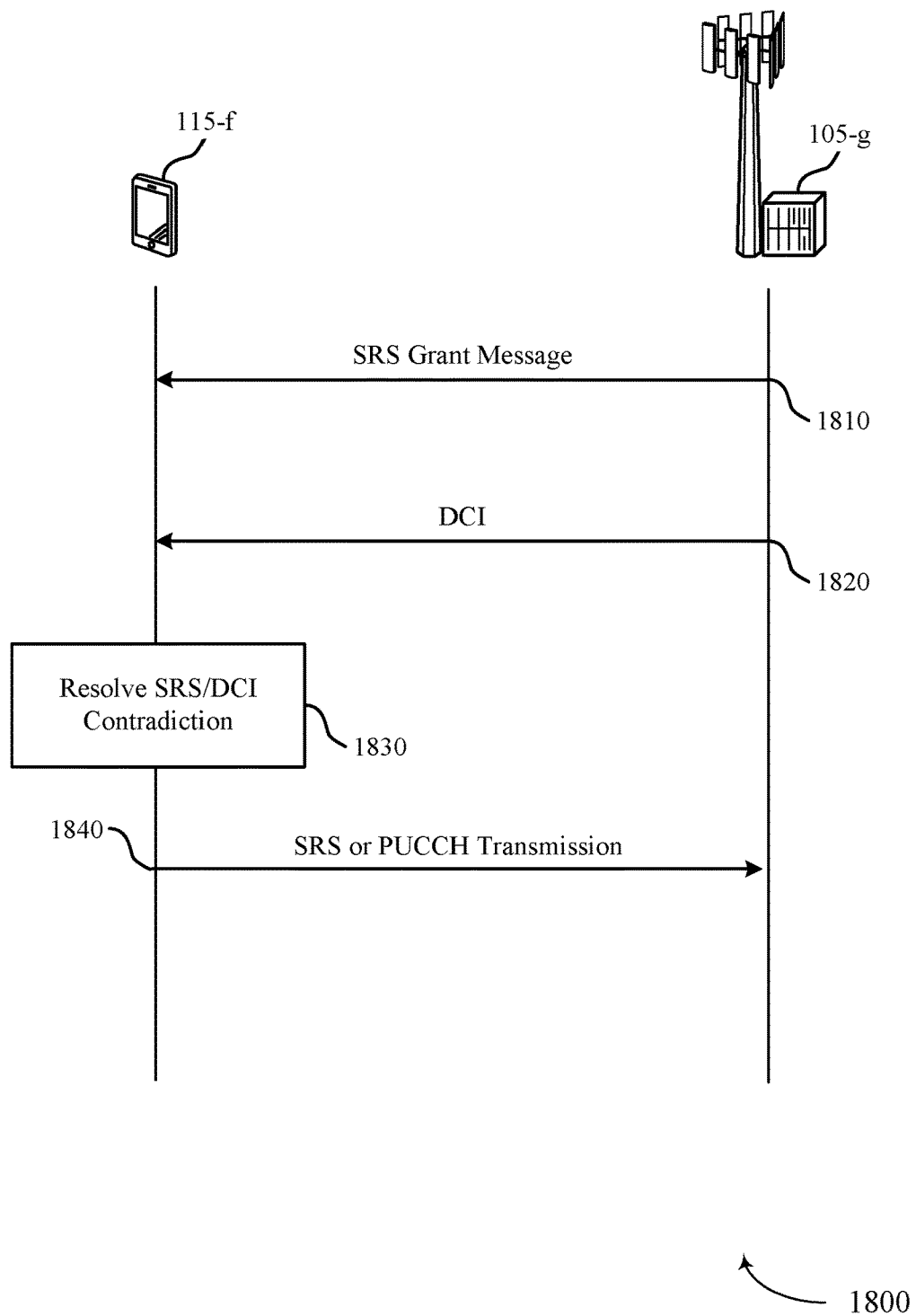
FIGS. 18, 21, and 22 illustrate examples of process flows in a system that supports dynamic sounding reference signal scheduling in accordance with aspects of the present disclosure.

FIG. 18 illustrates an example of a process flow 1800 for dynamic sounding reference signal scheduling in accordance with various aspects of the present disclosure. Process flow 1800 may include base station 105-*g* and UE 115-*f*, which may be examples of the corresponding devices described with reference to FIG. 1-2.

At step 1810, base station 105-*g* may transmit an SRS grant message to UE 115-*f*. The SRS grant message may include an indication of SRS parameters associated with SRS transmissions from UE 115-*f*. The indication of SRS parameters may include the SRS parameters or, alternatively, may include a location pointer to indicate where SRS parameters are being signaled (e.g., a location pointer to PDSCH, where PDSCH includes the SRS transmission parameters). In some cases, the SRS parameters may be determined from UE feedback previously sent to base station 105-*g*. The SRS grant message may be sent on a control channel (e.g., PDCCH).

The SRS grant message may be sent in a downlink control information (DCI) of a subframe. The DCI may include one or more bits associated with one or more parameters.

In one example, the DCI may indicate a number of uplink symbols for a PUCCH. In other examples, the DCI may indicate a number of uplink symbols for a SRS. The PUCCH or SRS may be transmitted at the end of a subframe, for example the subframe that included the DCI. In some examples, there may be different combinations of uplink symbols available for PUCCH and/or SRS, such that different numbers of bits of the DCI may indicate the combinations. For example, where three different combinations of symbols are possible (e.g., zero, one, or two symbols for PUCCH and/or SRS), two bits of DCI may be used to indicate the three different combinations.

In a second example, the DCI may indicate PUCCH scheduling (e.g., for a downlink grant). The DCI may indicate a sub-frame selected to carry the PUCCH. The number of bits of DCI for the indication of PUCCH sub-frames may depend on the number of possible sub-frames in which the PUCCH may occur. For example, the PUCCH may occur in one out of four different possible sub-frames, such that two bits of DCI may be used to indicate the PUCCH scheduling. In other examples, the DCI may carry other information concerning the PUCCH scheduling.

In a third example, the DCI may indicate SRS scheduling. One bit of the DCI may indicate whether or not SRS is transmitted. The DCI may also carry one or more bits to indicate which symbol SRS occupies. For example, the DCI may carry one bit to indicate that the SRS occupies one of two different symbol locations (e.g., to indicate whether the SRS occupies the last symbol or the second to last symbol of a sub-frame). In other examples, the DCI may carry one or more bits to indicate which sub-frame carries the SRS. The number of bits of DCI for the indication of which sub-frame carries the SRS may depend on the number of possible sub-frames in which the SRS may occur. For example, two bits of DCI may be used to indicate which one or four possible sub-frames carry SRS.

At step 1820, base station 105-*g* may transmit a DCI to UE 115-*f*. In some examples the SRS grant message may have been carried in a first DCI, and the DCI transmitted at step 1820 is a subsequent DCI. The subsequent DCI may carry information regarding an SRS, a PUCCH, or both, that contradicts information received earlier by UE 115-*f* concerning the SRS, the PUCCH, or both. Such information may be included in the subsequent DCI according to one of the techniques described in the present disclosure with respect to step 1810.

At step 1830, after receiving the subsequent DCI at step 1820, UE 115-*f* may identify that there is a contradiction between the information received in the SRS grant message at step 1810 and the DCI received at step 1820, and resolve the identified contradiction between the SRS grant and the DCI. In some examples, the contradiction may be resolved according to a set of predefined rules (e.g., regarding when to use or ignore DCI, when to use information in the SRS grant message). In some examples, the contradiction may be resolved upon receiving information, either from DCI or the SRS grant, that satisfies a threshold. In such examples, information received in DCI and/or an SRS grant may be used, or alternatively, may be ignored upon determining the information satisfies a threshold or meets a condition. That is, desired transmission criteria (e.g., timing, symbol allocation, etc.) may be used to conditionally determine how a contradiction is resolved (e.g., when to use or ignore contradicting information). Other examples based on the present disclosure are also contemplated.

In a first example to resolve the contradiction, the SRS grant may have been transmitted in a DCI of sub-frame N. The sub-frame may have indicated that the UE 115-*f* was to transmit SRS in the second to last symbol of a sub-frame N+K, where K≥2. Subsequent to sub-frame N, for example, in sub-frame N+M, where 0<M≤K, a bit field of the DCI may indicate that the number of UL symbols allocated for PUCCH and/or SRS indicates that sub-frame N+K has only one symbol allocated for SRS and/or PUCCH. As such, UE 115-*f* may need to determine whether to follow the instructions in the prior SRS grant in the initial DCI (in sub-frame N), or to follow the bits in the subsequent DCI (sub-frame N+M). In some configurations, UE 115-*f* may determine to transmit an SRS message according to the indication of SRS parameters found in the initial DCI that includes the SRS grant message at step 1810, and ignore the information transmitted in the subsequent DCI. In some configurations, UE 115-*f* may determine to ignore the SRS parameters found in the initial DCI, and to transmit an SRS message according to the indication of SRS parameters according to the information transmitted in the subsequent DCI.

In a second example to resolve the contradiction at step 1830, the SRS grant may have been transmitted in a DCI of sub-frame N. The sub-frame may have indicated that the UE 115-*f* was to transmit SRS in the last symbol of a sub-frame N+K, where K≥2. Subsequent to sub-frame N, for example, in sub-frame N+M, where 0<M≤K, a bit field of the DCI related to the PUCCH scheduling in the DCI grant may indicate that the PUCCH should be transmitted in the last symbol of the sub-frame N+K. In view of this contradiction, UE 115-*f* may need to determine whether to follow the instructions in the prior SRS grant in the initial DCI (in sub-frame N), or to follow the bits in the subsequent DCI (sub-frame N+M). In some configurations, UE 115-*f* may determine to transmit an SRS message according to the indication of SRS parameters found in the initial DCI that includes the SRS grant message at step 1810, and ignore the information transmitted in the subsequent DCI. In some configurations, UE 115-*f* may determine to ignore the indication of SRS parameters found in the initial DCI, and to follow the PUCCH scheduling according to the information transmitted in the subsequent DCI. In other configurations, UE 115-*f* may determine to ignore all information transmitted in the initial (first) DCI and ignore all information transmitted in the subsequent (second) DCI.

In each of the examples given above for resolving a SRS grant message and DCI contradiction, the DCI may be received immediately subsequent to the SRS grant message (which may, for example, also be part of a previous or initial DCI), or the DCI may be received a number of sub-frames later. Similarly, the SRS or PUCCH may be scheduled for the same sub-frame as the subsequent DCI, or may be scheduled for subsequent sub-frames.

At step 1840, the SRS or PUCCH transmission may occur. As described above, the transmission of an SRS transmission or PUCCH may depend on UE 115-*f* resolving a contradiction between the SRS grant message and a subsequently-received DCI.

Figure 21:
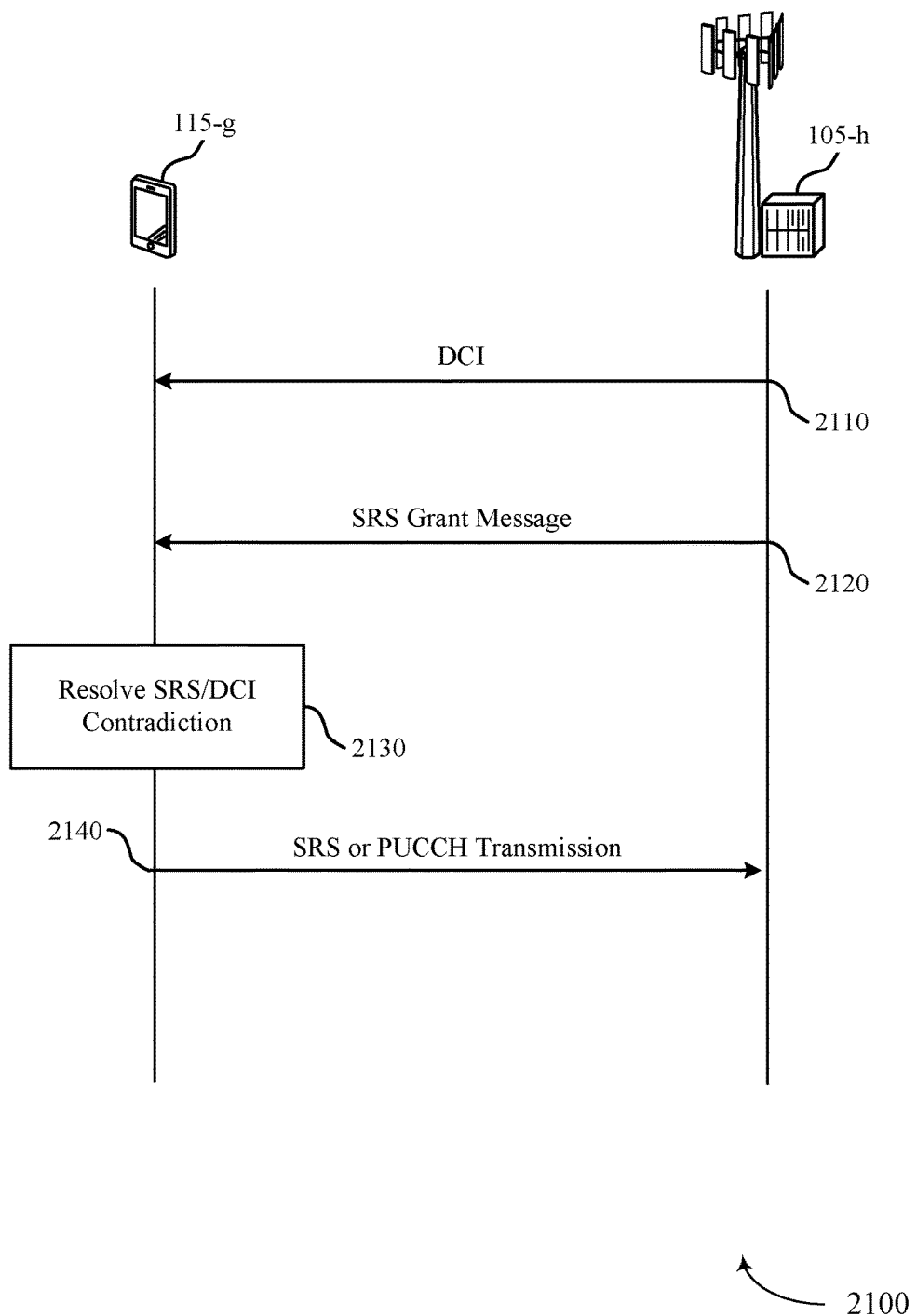

FIG. 21 illustrates an example of a process flow 2100 for dynamic sounding reference signal scheduling in accordance with various aspects of the present disclosure. Process flow 2100 may include base station 105-*h* and UE 115-*g*, which may be examples of the corresponding devices described with reference to FIG. 1-2.

At step 2110, base station 105-*h* may transmit a DCI to UE 115-*g*. In one example, the DCI may indicate a number of uplink symbols for a PUCCH. In other examples, the DCI may indicate a number of uplink symbols for a SRS. The PUCCH or SRS may be transmitted at the end of a subframe, for example the subframe that included the DCI. In some examples, there may be different combinations of uplink symbols available for PUCCH and/or SRS, such that different numbers of bits of the DCI may indicate the combinations. For example, where three different combinations of symbols are possible (e.g., zero, one, or two symbols for PUCCH and/or SRS), two bits of DCI may be used to indicate the three different combinations.

In a second example, the DCI may indicate PUCCH scheduling (e.g., for a downlink grant). The DCI may indicate a sub-frame selected to carry the PUCCH. The number of bits of DCI for the indication of PUCCH sub-frames may depend on the number of possible sub-frames in which the PUCCH may occur. For example, the PUCCH may occur in one out of four different possible sub-frames, such that two bits of DCI may be used to indicate the PUCCH scheduling. In other examples, the DCI may carry other information concerning the PUCCH scheduling.

In a third example, the DCI may indicate SRS scheduling. One bit of the DCI may indicate whether or not SRS is transmitted. The DCI may also carry one or more bits to indicate which symbol SRS occupies. For example, the DCI may carry one bit to indicate that the SRS occupies one of two different symbol locations (e.g., to indicate whether the SRS occupies the last symbol or the second to last symbol of a sub-frame). In other examples, the DCI may carry one or more bits to indicate which sub-frame carries the SRS. The number of bits of DCI for the indication of which sub-frame carries the SRS may depend on the number of possible sub-frames in which the SRS may occur. For example, two bits of DCI may be used to indicate which one or four possible sub-frames carry SRS.

The DCI may carry information regarding an SRS, a PUCCH, or both, that contradicts subsequent information received by UE 115-*g* concerning the SRS, the PUCCH, or both. Such information may be included in the earlier DCI according to one of the techniques described below with respect to step 2120.

At step 2120, base station 105-*h* may transmit an SRS grant message to UE 115-*g*. The SRS grant message may include an indication of SRS parameters associated with SRS transmissions from base station 105-*h*. The indication of SRS parameters may include the SRS parameters or, alternatively, may include a location pointer to indicate where SRS parameters are being signaled (e.g., a location pointer to PDSCH, where PDSCH includes the SRS transmission parameters). In some cases, the SRS parameters may be determined from UE feedback previously sent to base station 105-*h*. The SRS grant message may be sent on a control channel (e.g., PDCCH). The SRS grant message may be sent in a downlink control information (DCI) of a subframe. The DCI may include one or more bits associated with one or more parameters.

At step 2130, after receiving the subsequent SRS grant message at step 2120, UE 115-*g* may identify that there is a contradiction between the information received in the SRS grant message at step 2120 and the DCI received at step 2110, and resolve the identified contradiction between the SRS grant and the DCI.

In a first example to resolve the contradiction, the DCI may have been transmitted in sub-frame N. The sub-frame may have indicated that the UE 115-*g* was to transmit SRS in the second to last symbol of a sub-frame N+K, where K≥2. Subsequent to sub-frame N, for example, in sub-frame N+M, where 0<M≤K, an SRS grant in the subsequent DCI may indicate that the number of UL symbols allocated for PUCCH and/or SRS indicates that sub-frame N+K has only one symbol allocated for SRS and/or PUCCH. As such, UE 115-*g* may need to determine whether to follow the instructions in the initial DCI (in sub-frame N), or to follow the bits in the SRS grant in the subsequent DCI (sub-frame N+M). In some configurations, UE 115-*g* may determine to transmit an SRS transmission according to the indication of SRS parameters found in the initial DCI at step 2110, and ignore the information transmitted in the subsequent DCI that includes the SRS grant message. In some configurations, UE 115-*g* may determine to ignore the SRS parameters found in the initial DCI, and to transmit an SRS transmission according to the SRS grant in the subsequent DCI.

In a second example to resolve the contradiction at step 2130, the DCI may have been transmitted in a DCI of sub-frame N. The sub-frame may have indicated that the UE 115-*g* was to transmit SRS in the last symbol of a sub-frame N+K, where K≥2. Subsequent to sub-frame N, for example, in sub-frame N+M, where 0<M≤K, an SRS grant in the subsequent DCI related to the PUCCH scheduling in the DCI may indicate that the PUCCH should be transmitted in the last symbol of the sub-frame N+K. In view of this contradiction, UE 115-*g* may need to determine whether to follow the instructions in the prior DCI (in sub-frame N), or to follow the bits in the SRS grant in the subsequent DCI (sub-frame N+M). In some configurations, UE 115-*g* may determine to transmit an SRS transmission according to the indication of SRS parameters found in the initial DCI at step 2110, and ignore the information transmitted in the SRS grant in the subsequent DCI. In some configurations, UE 115-*g* may determine to ignore the initial DCI, and to follow the PUCCH scheduling according to the information transmitted in the subsequent DCI. In other configurations, UE 115-*g* may determine to ignore all information transmitted in the initial (first) DCI and ignore all information transmitted in the subsequent (second) DCI.

In each of the examples given above for resolving a SRS grant message and DCI contradiction, the SRS grant message (which may, for example, also be part of a previous or initial DCI) may be received immediately subsequent to the DCI, or the SRS grant message may be received a number of sub-frames later. Similarly, the SRS or PUCCH may be scheduled for the same sub-frame as the earlier DCI, or may be scheduled for earlier sub-frames.

At step 2140, the SRS or PUCCH transmission may occur. As described above, the transmission of an SRS transmission or PUCCH may depend on UE 115-*g* resolving a contradiction between the SRS grant message and a previously-received DCI.

Figure 22:
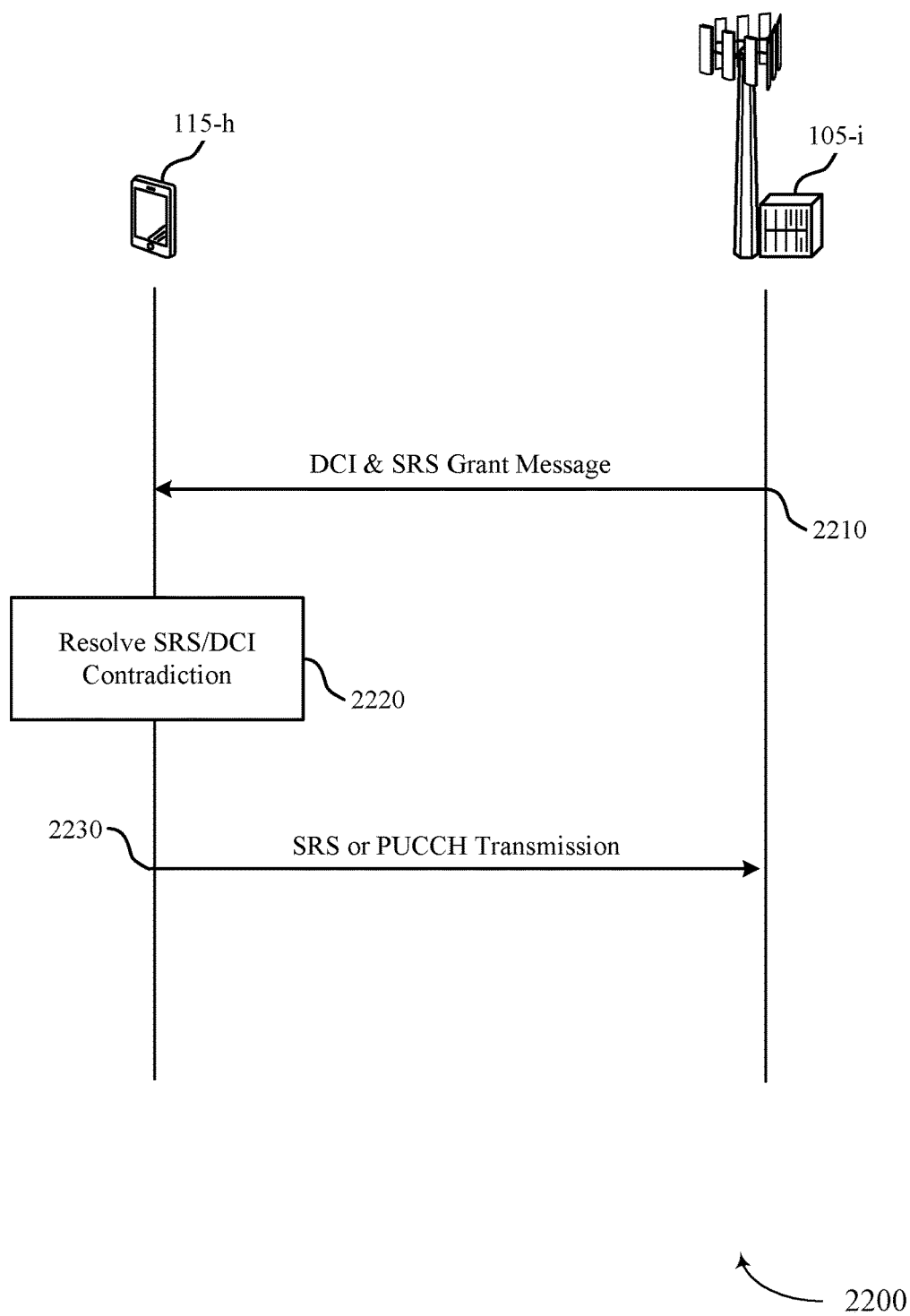

FIG. 22 illustrates an example of a process flow 2200 for dynamic sounding reference signal scheduling in accordance with various aspects of the present disclosure. Process flow 2200 may include base station 105-*i* and UE 115-*h*, which may be examples of the corresponding devices described with reference to FIG. 1-2.

At step 2210, base station 105-*i* may transmit, in the same subframe, a first DCI and a second DCI to UE 115-*h*. The second DCI may contain an SRS grant message. The first DCI may be a DCI sent to UE 115 as described above with reference to one or more of step 1820 of FIG. 18 or step 2110 of FIG. 21. The SRS grant message may be a SRS grant message sent to UE 115 as described above with reference to one or more of step 1810 of FIG. 18 or step 2120 of FIG. 21. The information transmitted in the first DCI of the subframe may contradict the indication of SRS parameters in the SRS grant message in the same subframe. In some examples, the first DCI and the second DCI (e.g., the SRS grant message) may be received by UE 115-*h* in different subframes. In some cases, the DCI may be received in a subframe before the SRS grant message is received. In other cases, the DCI may be received in a subframe after the SRS grant message is received.

At step 2220, after receiving the subsequent SRS grant message at step 2120, UE 115-*h* may identify that there is a contradiction between the information received in the SRS grant message and the first DCI received at step 2210, and resolve the identified contradiction between the SRS grant and the first DCI. For example, UE 115-*h* may compare the SRS grant message (e.g., the second DCI) and the first DCI. The contradiction between the information received in the SRS grant message and the information received in the first DCI may be resolved by ignoring information transmitted in either the SRS grant message or the first DCI based on the comparison.

In some configurations, UE 115-*h* may determine to transmit according to the parameters found in the first DCI, and ignore the information transmitted in a second DCI that includes the SRS grant message. In some configurations, UE 115-*h* may determine to ignore the first DCI, and transmit an SRS transmission according to the SRS grant in the second DCI. In some configurations, UE 115-*h* may determine to transmit an SRS transmission according to the indication of SRS parameters found in the first DCI, and ignore the information transmitted in the SRS grant in the second DCI. In some configurations, UE 115-*h* may determine to ignore the first DCI, and to follow the PUCCH scheduling according to the information transmitted in the second DCI. In other configurations, UE 115-*h* may determine to ignore all information transmitted in the first DCI in the subframe and all information transmitted in a second DCI received in the same subframe.

At step 2230, the SRS or PUCCH transmission may occur. As described above, the transmission of an SRS transmission or PUCCH may depend on UE 115-*h* resolving a contradiction between the SRS grant message and the first DCI. That is, an SRS transmission may be transmitted based on information a determination to ignore information. In some cases, all information received in the SRS grant message and the first DCI may be ignored. In other cases, information in the first DCI may be ignored and the SRS transmission may be sent based on information (e.g., an indication of SRS parameters) transmitted in the SRS grant message. In some cases, information in the SRS grant message may be ignored, and the SRS transmission may be sent based on information according to the first DCI.

Figure 6:
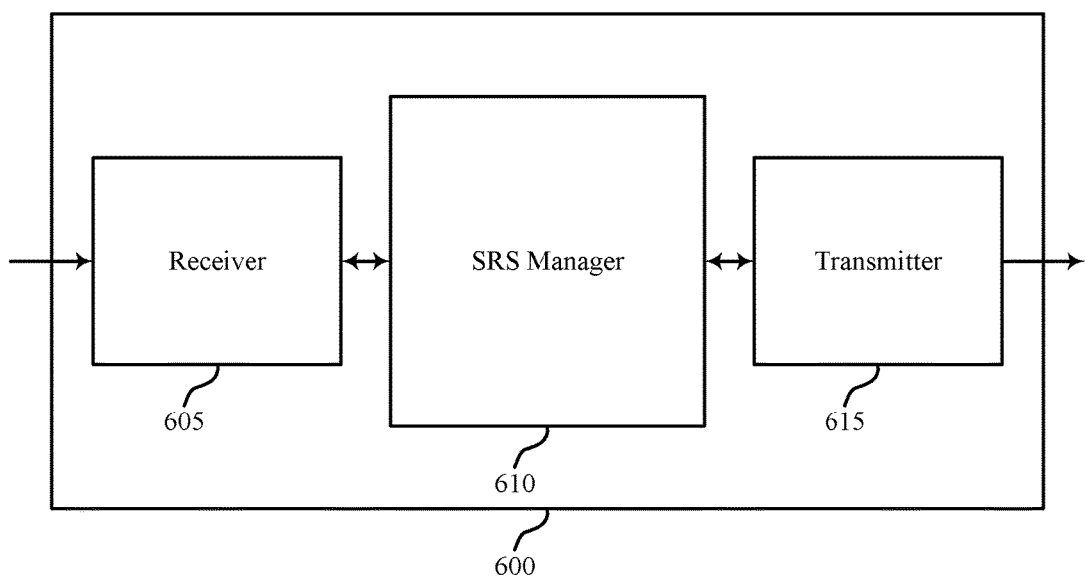
FIGS. 6 through 8 show block diagrams of a wireless device that supports dynamic sounding reference signal scheduling in accordance with aspects of the present disclosure.

FIG. 6 shows a block diagram of a wireless device 600 that supports dynamic sounding reference signal scheduling in accordance with various aspects of the present disclosure. Wireless device 600 may be an example of aspects of a base station 105 described with reference to FIGS. 1, 2, and 5. Wireless device 600 may include receiver 605, SRS manager 610 and transmitter 615. Wireless device 600 may also include a processor. Each of these components may be in communication with each other.

The receiver 605 may receive information such as packets, user data, or control information associated with various information channels (e.g., control channels, data channels, and information related to dynamic sounding reference signal scheduling, etc.). Information may be passed on to other components of the device. The receiver 605 may be an example of aspects of the transceiver 925 described with reference to FIG. 9.

The SRS manager 610 may identify an SRS configuration for a UE, transmit an SRS grant message to the UE, the SRS grant message based on the SRS configuration for the UE and comprising an indication of SRS parameters, and receive, from the UE, one or more SRS transmissions according to the SRS grant message. The SRS manager 610 may also be an example of aspects of the SRS manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
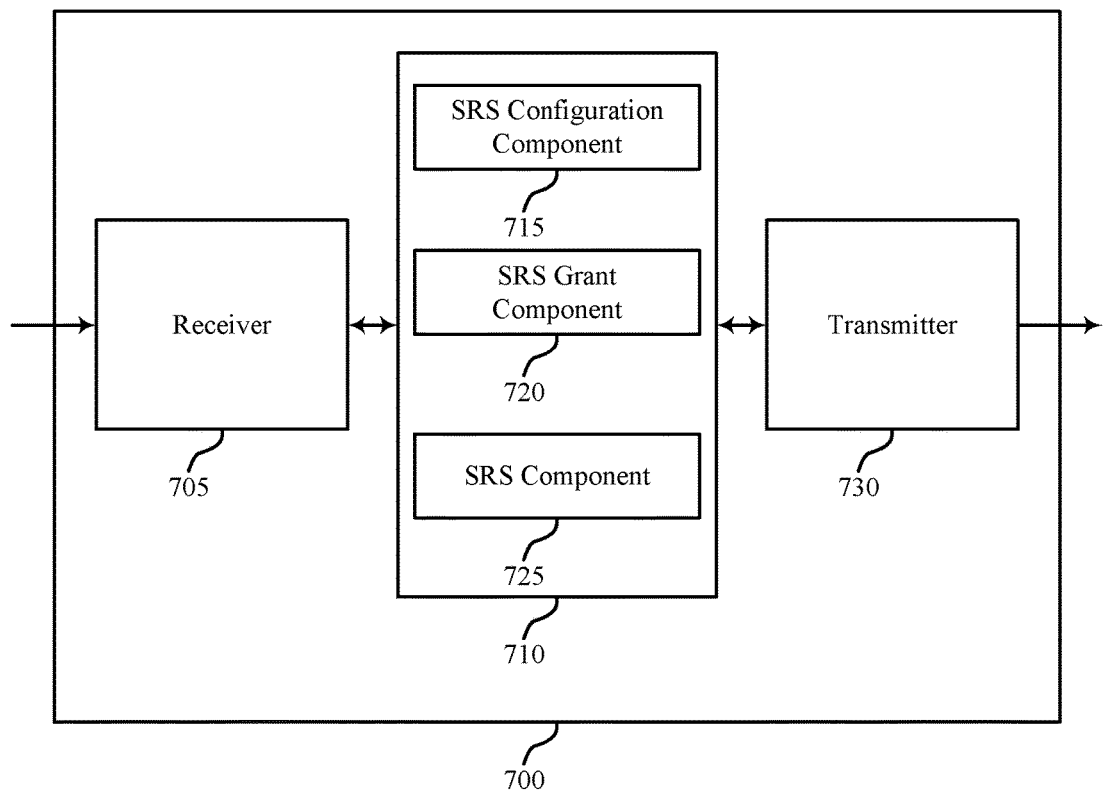

FIG. 7 shows a block diagram of a wireless device 700 that supports dynamic sounding reference signal scheduling in accordance with various aspects of the present disclosure. Wireless device 700 may be an example of aspects of a wireless device 600 or a base station 105 described with reference to FIGS. 1, 2, 5, and 6. Wireless device 700 may include receiver 705, SRS manager 710 and transmitter 730. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The SRS manager 710 may be an example of aspects of SRS manager 610 described with reference to FIG. 6. The SRS manager 710 may include SRS configuration component 715, SRS grant component 720 and SRS component 725. The SRS manager 710 may be an example of aspects of the SRS manager 905 described with reference to FIG. 9.

The SRS configuration component 715 may identify an SRS configuration for a UE. The SRS grant component 720 may transmit an SRS grant message to the UE, the SRS grant message based on the SRS configuration for the UE and comprising an indication of SRS parameters, and transmit the indication of the SRS parameters in the SRS grant message that comprises a set of SRS transmission parameters associated with the SRS transmissions from the UE. The SRS component 725 may receive, from the UE, one or more SRS transmissions according to the SRS grant message.

In some cases, the SRS grant message is transmitted on a control channel. In some cases, the control channel comprises a PDCCH. In some cases, the SRS parameters comprises one or more of a timing component associated with the SRS transmissions, a repetition parameter associated with the SRS transmissions, a starting position pointer associated with the SRS transmissions, an occupied bandwidth parameter associated with the SRS transmissions, a symbol index value associated with the SRS transmissions, an UE antenna port indication associated with the SRS transmissions, an UE antenna subarray indication associated with the SRS transmissions, a UE beam indication associated with the SRS transmissions, a cyclic shift parameter associated with the SRS transmissions, a comb offset parameter associated with the SRS transmissions, or combinations thereof. In some cases, the SRS parameter comprises a timing component associated with the SRS transmissions. The timing component may include a symbol location of the subframe associated with SRS transmissions. The timing component may include a subframe index associated with the subframe index. In some aspects, the timing component may include an uplink subframe index associated with a PUSCH transmission and may be received in an uplink grant. In some aspects, the timing component further comprises an uplink subframe index associated with a PUCCH transmission and may be received in a downlink grant.

In some cases, the subframe index of SRS may come from the timing component of PUCCH or PUSCH. The timing component of PUCCH, received in a DL grant, may include the subframe index associated with both SRS and PUCCH transmission. The timing component of PUSCH, received in a UL grant, may include the subframe index associated with SRS and PUSCH transmission.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
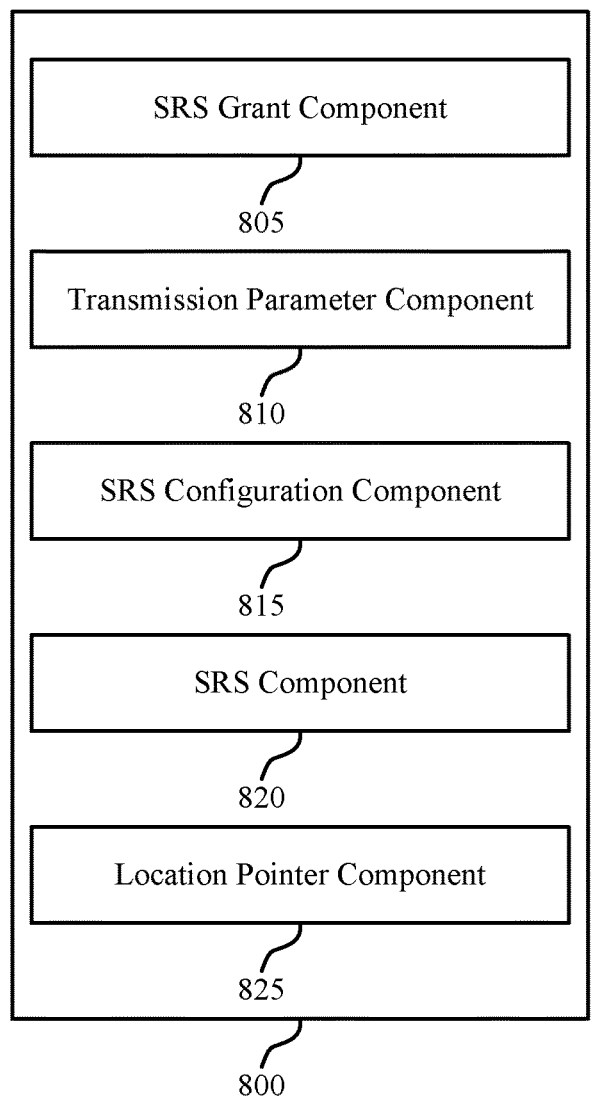

FIG. 8 shows a block diagram of an SRS manager 800 which may be an example of the corresponding component of wireless device 600 or wireless device 700. That is, SRS manager 800 may be an example of aspects of SRS manager 610 or SRS manager 710 described with reference to FIGS. 6 and 7. The SRS manager 800 may also be an example of aspects of the SRS manager 905 described with reference to FIG. 9.

The SRS manager 800 may include SRS grant component 805, transmission parameter component 810, SRS configuration component 815, SRS component 820 and location pointer component 825. Each of these modules may communicate, directly or indirectly, with one another (e.g., via one or more buses).

The SRS grant component 805 may transmit an SRS grant message to the UE, the SRS grant message based on the SRS configuration for the UE and comprising an indication of SRS parameters, and transmit the indication of the SRS parameters in the SRS grant message that comprises a set of SRS transmission parameters associated with the SRS transmissions from the UE. In some cases, the SRS grant message is transmitted on a control channel.

The transmission parameter component 810 may identify the SRS configuration for the UE based on the transmission parameters. In some cases, identifying the SRS configuration for the UE comprises: identifying one or more transmission parameters associated with the UE. In some cases, the transmission parameters comprises one or more of a channel condition parameter, a traffic type parameter, a data load indicator, a communication channel parameter, or combinations thereof.

The SRS configuration component 815 may identify an SRS configuration for a UE. The SRS component 820 may receive, from the UE, one or more SRS transmissions according to the SRS grant message.

The location pointer component 825 may generate a location pointer associated with a set of SRS transmission parameters associated with the SRS transmissions from the UE. In some cases, the location pointer provides an indication of a shared data channel that comprises the set of SRS transmission parameters. In some cases, the shared data channel comprises a PDSCH.

Figure 9:
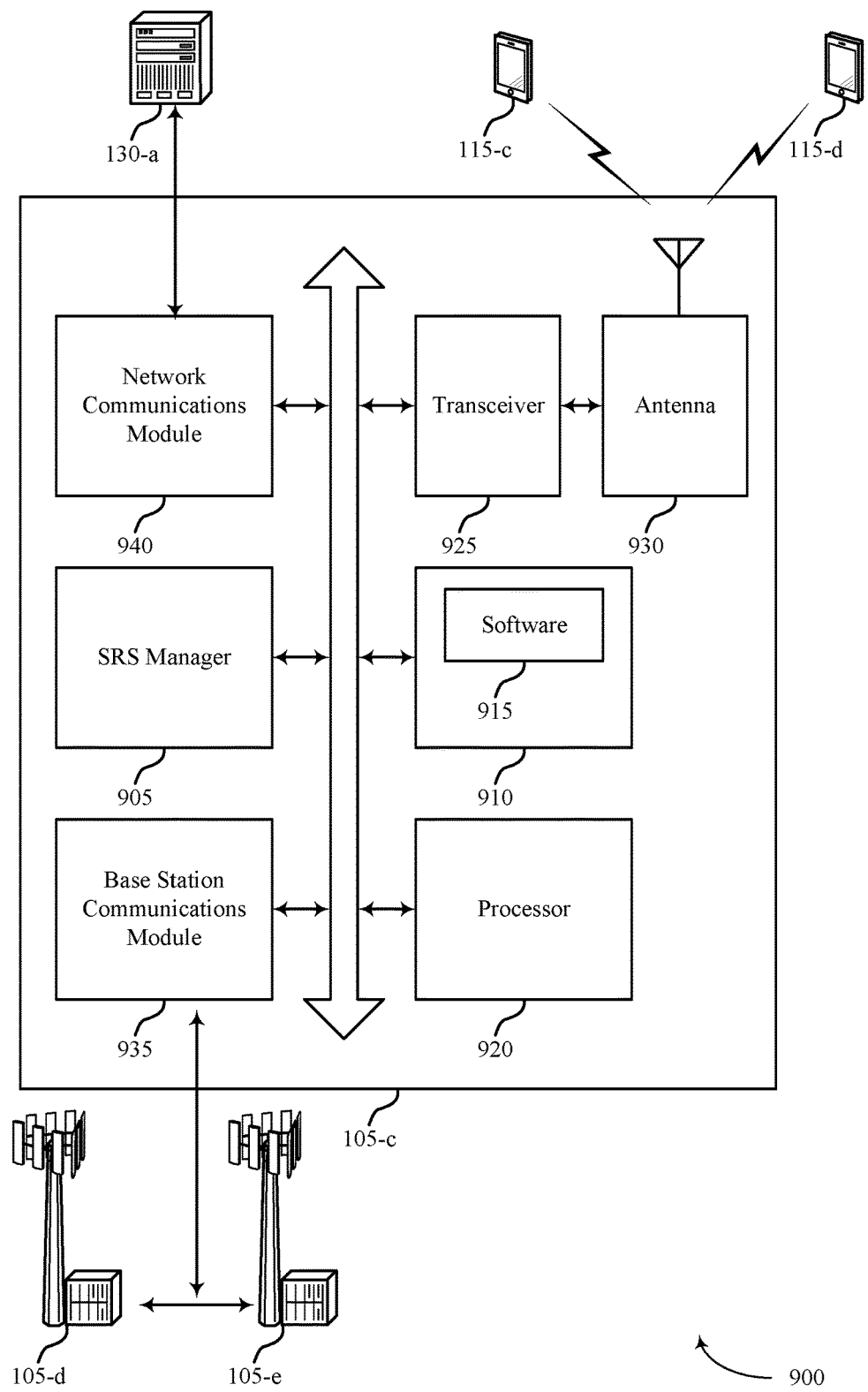
FIG. 9 illustrates a block diagram of a system including a base station that supports dynamic sounding reference signal scheduling in accordance with aspects of the present disclosure.

FIG. 9 shows a diagram of a wireless system 900 including a device configured that supports dynamic sounding reference signal scheduling in accordance with various aspects of the present disclosure. For example, wireless system 900 may include base station 105-c, which may be an example of a wireless device 600, a wireless device 700, or a base station 105 as described with reference to FIGS. 1, 2, and 5 through 7. Base station 105-c may also include components for bi-directional voice and data communications including components for transmitting communications and components for receiving communications. For example, base station 105-c may communicate bi-directionally with one or more UEs, such as UEs 115-c and/or 115-d.

Base station 105-c may also include SRS manager 905, memory 910, processor 920, transceiver 925, antenna 930, base station communications module 935 and network communications module 940. Each of these modules may communicate, directly or indirectly, with one another (e.g., via one or more buses).

The SRS manager 905 may be an example of an SRS manager as described with reference to FIGS. 6 through 8. The memory 910 may include random access memory (RAM) and read only memory (ROM). The memory 910 may store computer-readable, computer-executable software including instructions that, when executed, cause the processor to perform various functions described herein (e.g., dynamic sounding reference signal scheduling, etc.).

In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

The base station communications module 935 may manage communications with other base station 105, and may include a controller or scheduler for controlling communications with UEs 115 in cooperation with other base stations 105, such as base stations 105-*d* and/or 105-*e*. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
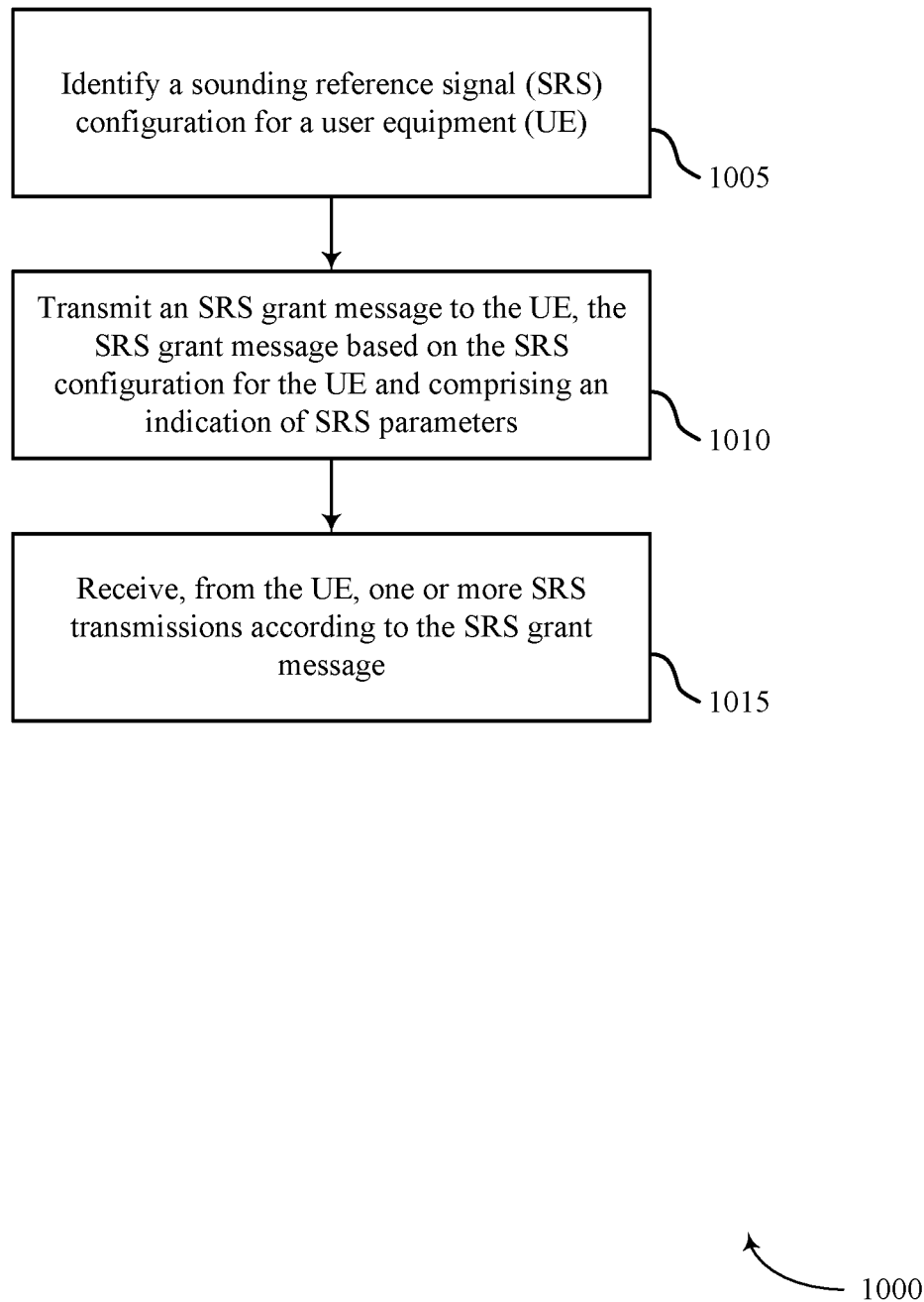
FIGS. 10 through 11 illustrate methods for dynamic sounding reference signal scheduling in accordance with aspects of the present disclosure.

FIG. 10 shows a flowchart illustrating a method 1000 for dynamic sounding reference signal scheduling in accordance with various aspects of the present disclosure. The operations of method 1000 may be implemented by a device such as a base station 105 or its components as described with reference to FIGS. 1, 2, and 5. For example, the operations of method 1000 may be performed by the SRS manager as described herein. In some examples, the base station 105 may execute a set of codes to control the functional elements of the device to perform the functions described below. Additionally or alternatively, the base station 105 may perform aspects the functions described below using special-purpose hardware.

At block 1005, the base station 105 may identify an SRS configuration for a UE as described above with reference to FIGS. 2 through 5. In certain examples, the operations of block 1005 may be performed by the SRS configuration component as described with reference to FIGS. 6 and 7.

At block 1010, the base station 105 may transmit an SRS grant message to the UE, the SRS grant message based on the SRS configuration for the UE and comprising an indication of SRS parameters as described above with reference to FIGS. 2 through 5. In certain examples, the operations of block 1010 may be performed by the SRS grant component as described with reference to FIGS. 6 and 7.

At block 1015, the base station 105 may receive, from the UE, one or more SRS transmissions according to the SRS grant message as described above with reference to FIGS. 2 through 5. In certain examples, the operations of block 1015 may be performed by the SRS component as described with reference to FIGS. 6 and 7.

Figure 11:
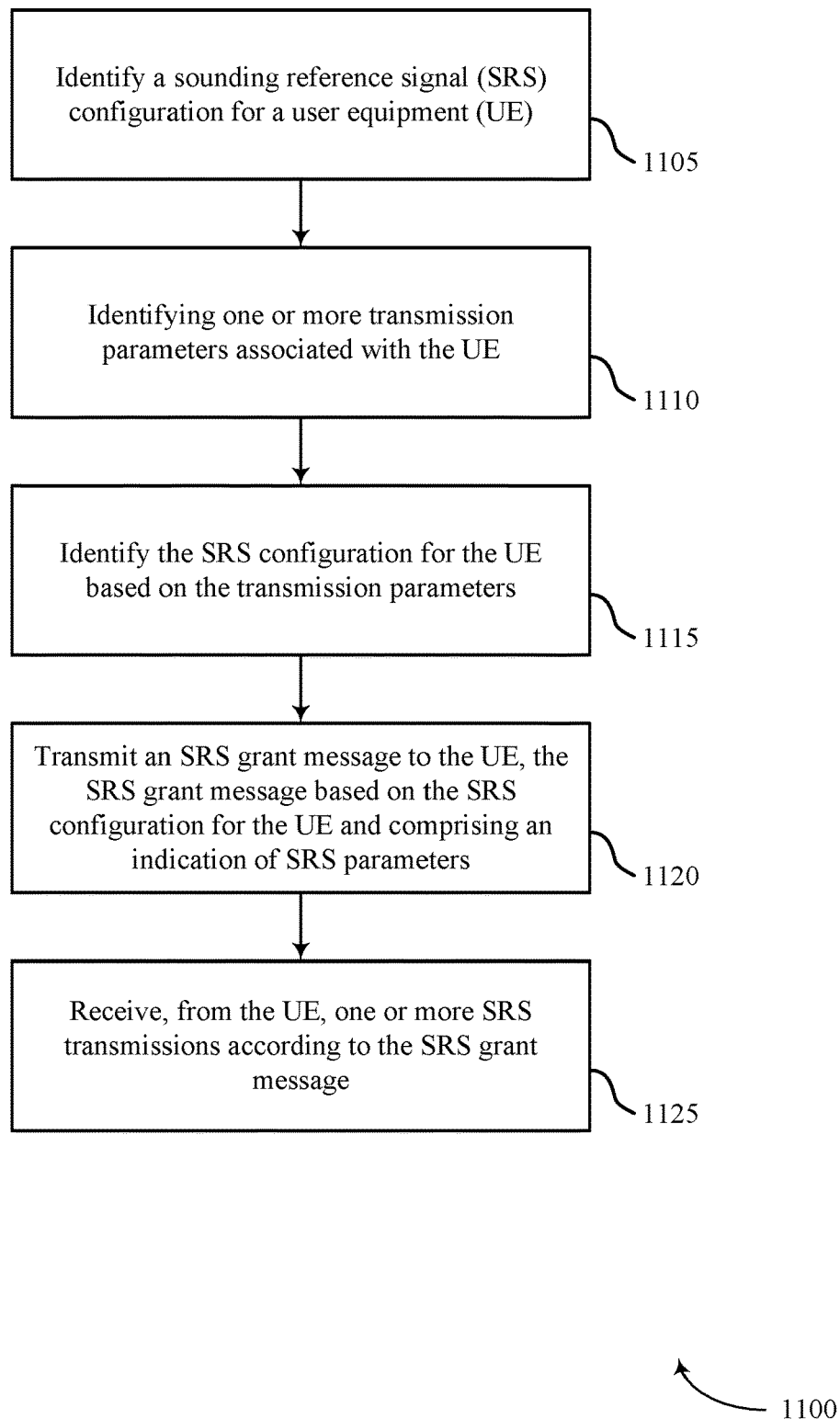

FIG. 11 shows a flowchart illustrating a method 1100 for dynamic sounding reference signal scheduling in accordance with various aspects of the present disclosure. The operations of method 1100 may be implemented by a device such as a base station 105 or its components as described with reference to FIGS. 1, 2, and 4. For example, the operations of method 1100 may be performed by the SRS manager as described herein. In some examples, the base station 105 may execute a set of codes to control the functional elements of the device to perform the functions described below. Additionally or alternatively, the base station 105 may perform aspects the functions described below using special-purpose hardware.

At block 1105, the base station 105 may identify an SRS configuration for a UE as described above with reference to FIGS. 2 through 5. In certain examples, the operations of block 1105 may be performed by the SRS configuration component as described with reference to FIGS. 6 and 7.

At block 1110, the base station 105 may identify one or more transmission parameters associated with the UE as described above with reference to FIGS. 2 through 5. In certain examples, the operations of block 1110 may be performed by the transmission parameter component as described with reference to FIGS. 6 and 7.

At block 1115, the base station 105 may identify the SRS configuration for the UE based on the transmission parameters as described above with reference to FIGS. 2 through 5. In certain examples, the operations of block 1115 may be performed by the transmission parameter component as described with reference to FIGS. 6 and 7.

At block 1120, the base station 105 may transmit an SRS grant message to the UE, the SRS grant message based on the SRS configuration for the UE and comprising an indication of SRS parameters as described above with reference to FIGS. 2 through 5. In certain examples, the operations of block 1120 may be performed by the SRS grant component as described with reference to FIGS. 6 and 7.

At block 1125, the base station 105 may receive, from the UE, one or more SRS transmissions according to the SRS grant message as described above with reference to FIGS. 2 through 5. In certain examples, the operations of block 1125 may be performed by the SRS component as described with reference to FIGS. 6 and 7.

Figure 12:
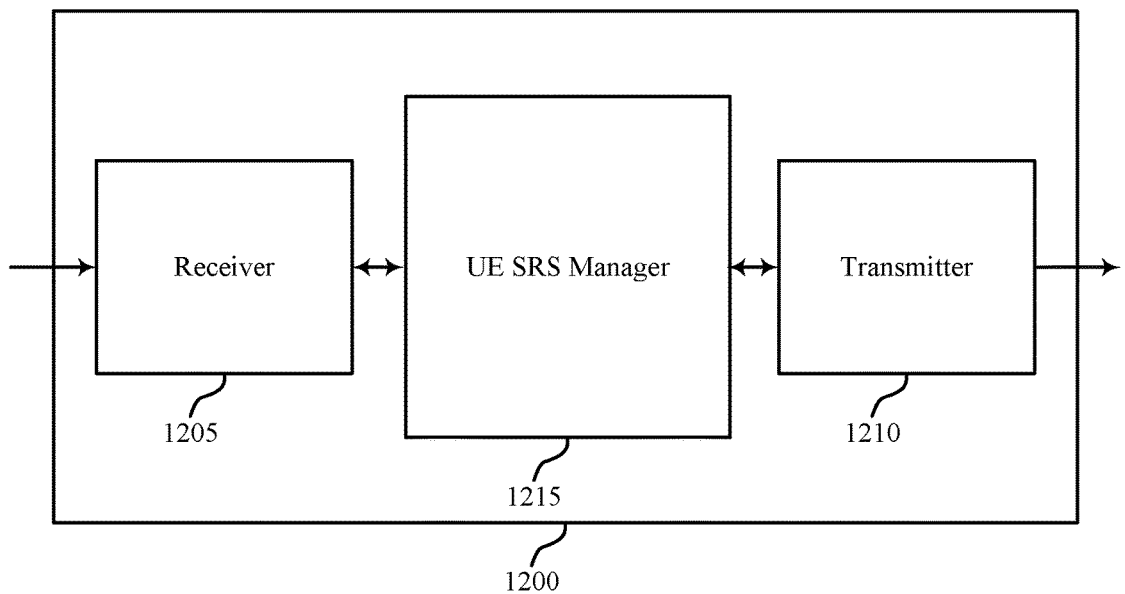
FIGS. 12 through 14 show block diagrams of a wireless device that supports claims in accordance with aspects of the present disclosure.

FIG. 12 shows a block diagram of a wireless device 1200 that supports claims in accordance with various aspects of the present disclosure. Wireless device 1200 may be an example of aspects of a UE 115 described with reference to FIGS. 1 and 2. Wireless device 1200 may include receiver 1205, transmitter 1210 and UE SRS manager 1215. Wireless device 1200 may also include a processor. Each of these components may be in communication with each other.

The receiver 1205 may receive information such as packets, user data, or control information associated with various information channels (e.g., control channels, data channels, and information related to claims, etc.). Information may be passed on to other components of the device. The receiver 1205 may be an example of aspects of the transceiver 1525 described with reference to FIG. 15.

The transmitter 1210 may transmit signals received from other components of wireless device 1200. In some examples, the transmitter 1210 may be collocated with a receiver in a transceiver module. For example, the transmitter 1210 may be an example of aspects of the transceiver 1525 described with reference to FIG. 15. The transmitter 1210 may include a single antenna, or it may include a plurality of antennas.

The UE SRS manager 1215 may receive an SRS grant message from a base station, the SRS grant message based on an identified SRS configuration, the SRS grant message comprising an indication of SRS parameters, and transmit, to the base station, one or more SRS transmissions according to the SRS grant message. The UE SRS manager 1215 may also be an example of aspects of the UE SRS manager 1505 described with reference to FIG. 15.

Figure 13:
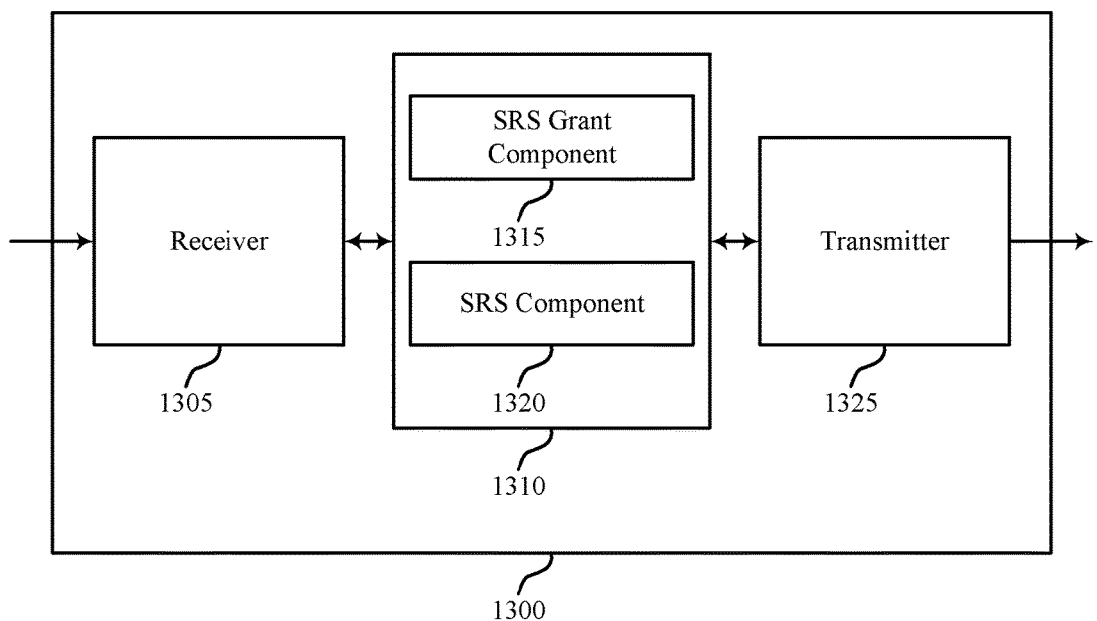

FIG. 13 shows a block diagram of a wireless device 1300 that supports claims in accordance with various aspects of the present disclosure. Wireless device 1300 may be an example of aspects of a wireless device 1200 or a UE 115 described with reference to FIGS. 1, 2 and 12. Wireless device 1300 may include receiver 1305, UE SRS manager 1310 and transmitter 1325. Wireless device 1300 may also include a processor. Each of these components may be in communication with each other.

The receiver 1305 may receive information which may be passed on to other components of the device. The receiver 1305 may also perform the functions described with reference to the receiver 1205 of FIG. 12. The receiver 1305 may be an example of aspects of the transceiver 1525 described with reference to FIG. 15.

The UE SRS manager 1310 may be an example of aspects of UE SRS manager 1215 described with reference to FIG. 12. The UE SRS manager 1310 may include SRS grant component 1315 and SRS component 1320. The UE SRS manager 1310 may be an example of aspects of the UE SRS manager 1505 described with reference to FIG. 15.

The SRS grant component 1315 may receive an SRS grant message from a base station, the SRS grant message based on an identified SRS configuration, the SRS grant message comprising an indication of SRS parameters, and receive the indication of the SRS parameters in the SRS grant message that comprises a set of SRS transmission parameters associated with the SRS transmissions from the UE.

In some cases, the SRS grant message is received on a control channel. In some cases, the control channel comprises a physical downlink control channel (PDCCH). In some cases, the SRS parameters comprises one or more of a repetition parameter associated with the SRS transmissions, a starting position pointer associated with the SRS transmissions, an occupied bandwidth parameter associated with the SRS transmissions, a symbol index value associated with the SRS transmissions, an UE antenna port indication associated with the SRS transmissions, an UE antenna subarray indication associated with the SRS transmissions, a UE beam indication associated with the SRS transmissions, a cyclic shift parameter associated with the SRS transmissions, a comb offset parameter associated with the SRS transmissions, or combinations thereof.

In some cases, the identified SRS configuration for the UE comprises an identification of one or more transmission parameters associated with the UE, and an identification of the SRS configuration for the UE based on the transmission parameters. In some cases, the transmission parameters comprises one or more of a channel condition parameter, a traffic type parameter, a data load indicator, a communication channel parameter, or combinations thereof.

The SRS component 1320 may transmit, to the base station, one or more SRS transmissions according to the SRS grant message. The transmitter 1325 may transmit signals received from other components of wireless device 1300. In some examples, the transmitter 1325 may be collocated with a receiver in a transceiver module. For example, the transmitter 1325 may be an example of aspects of the transceiver 1525 described with reference to FIG. 15. The transmitter 1325 may utilize a single antenna, or it may utilize a plurality of antennas.

Figure 14:
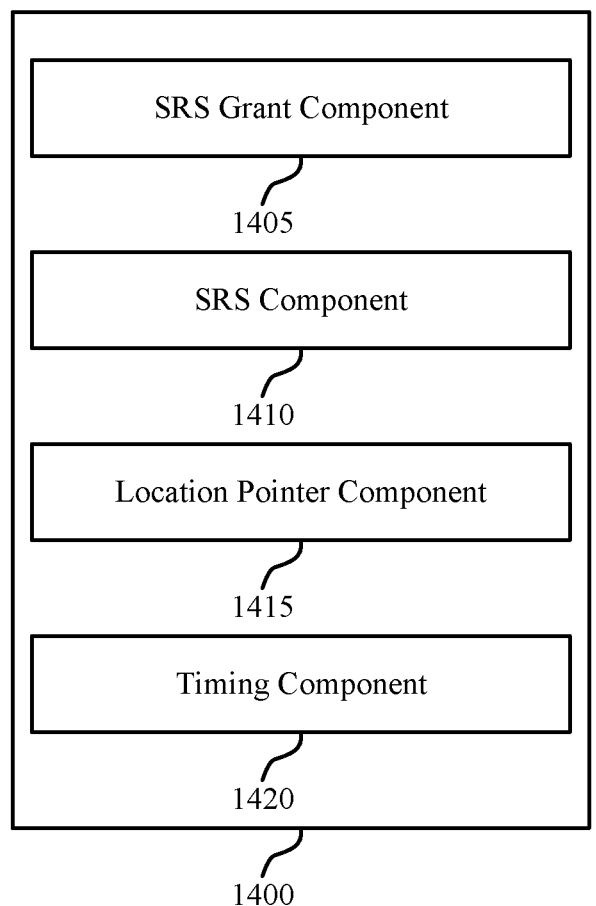

FIG. 14 shows a block diagram of a UE SRS manager 1400 which may be an example of the corresponding component of wireless device 1200 or wireless device 1300. That is, UE SRS manager 1400 may be an example of aspects of UE SRS manager 1215 or UE SRS manager 1310 described with reference to FIGS. 12 and 13. The UE SRS manager 1400 may also be an example of aspects of the UE SRS manager 1505 described with reference to FIG. 15.

The UE SRS manager 1400 may include SRS grant component 1405, SRS component 1410, location pointer component 1415 and timing component 1420. Each of these modules may communicate, directly or indirectly, with one another (e.g., via one or more buses).

The SRS grant component 1405 may receive an SRS grant message from a base station, the SRS grant message based on an identified SRS configuration, the SRS grant message comprising an indication of SRS parameters, and receive the indication of the SRS parameters in the SRS grant message that comprises a set of SRS transmission parameters associated with the SRS transmissions from the UE. The SRS component 1410 may transmit, to the base station, one or more SRS transmissions according to the SRS grant message.

The location pointer component 1415 may identify a location pointer associated with a set of SRS transmission parameters associated with the SRS transmissions from the UE. In some cases, the location pointer provides an indication of a shared data channel that comprises the set of SRS transmission parameters. In some cases, the shared data channel comprises a physical downlink shared channel (PDSCH).

The timing component 1420 may enable SRS timing operations. In some cases, the timing component comprises a symbol location associated with a subframe for the SRS transmissions. In some cases, the timing component comprises a subframe index associated with the SRS transmissions. In some cases, the timing component further comprises an uplink subframe index associated with a physical uplink shared channel (PUSCH) transmission. In some cases, the timing component is received in an uplink grant. In some cases, the timing component further comprises an uplink subframe index associated with a physical uplink control channel (PUCCH) transmission. In some cases, the timing component is received in a downlink grant.

Figure 15:
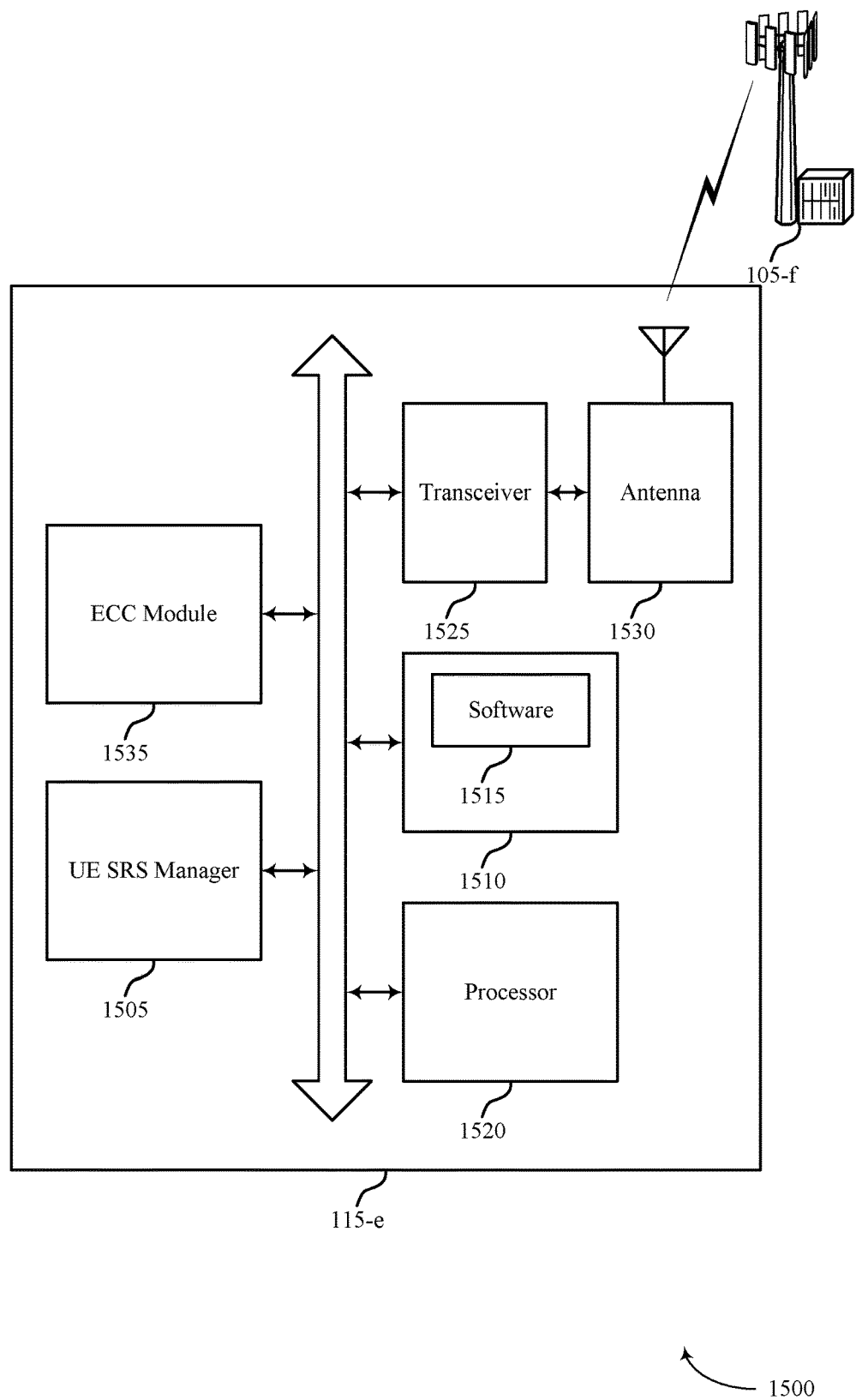
FIG. 15 illustrates a block diagram of a system including a UE that supports claims in accordance with aspects of the present disclosure.

FIG. 15 shows a diagram of a system 1500 including a device that supports claims in accordance with various aspects of the present disclosure. For example, system 1500 may include UE 115-e, which may be an example of a wireless device 1200, a wireless device 1300, or a UE 115 as described with reference to FIGS. 1, 2 and 12 through 14.

UE 115-e may also include UE SRS manager 1505, memory 1510, processor 1520, transceiver 1525, antenna 1530 and ECC module 1535. Each of these modules may communicate, directly or indirectly, with one another (e.g., via one or more buses). The UE SRS manager 1505 may be an example of a UE SRS manager as described with reference to FIGS. 12 through 14.

The memory 1510 may include random access memory (RAM) and read only memory (ROM). The memory 1510 may store computer-readable, computer-executable software including instructions that, when executed, cause the processor to perform various functions described herein (e.g., claims, etc.). In some cases, the software 1515 may not be directly executable by the processor but may cause a computer (e.g., when compiled and executed) to perform functions described herein. The processor 1520 may include an intelligent hardware device, (e.g., a central processing unit (CPU), a microcontroller, an application specific integrated circuit (ASIC), etc.)

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna 1530, which may be capable of concurrently transmitting or receiving multiple wireless transmissions.

ECC module 1535 may enable operations using enhanced component carriers (eCCs) such as communication using shared or unlicensed spectrum, using reduced TTIs or subframe durations, or using a large number of component carriers.

Figure 16:
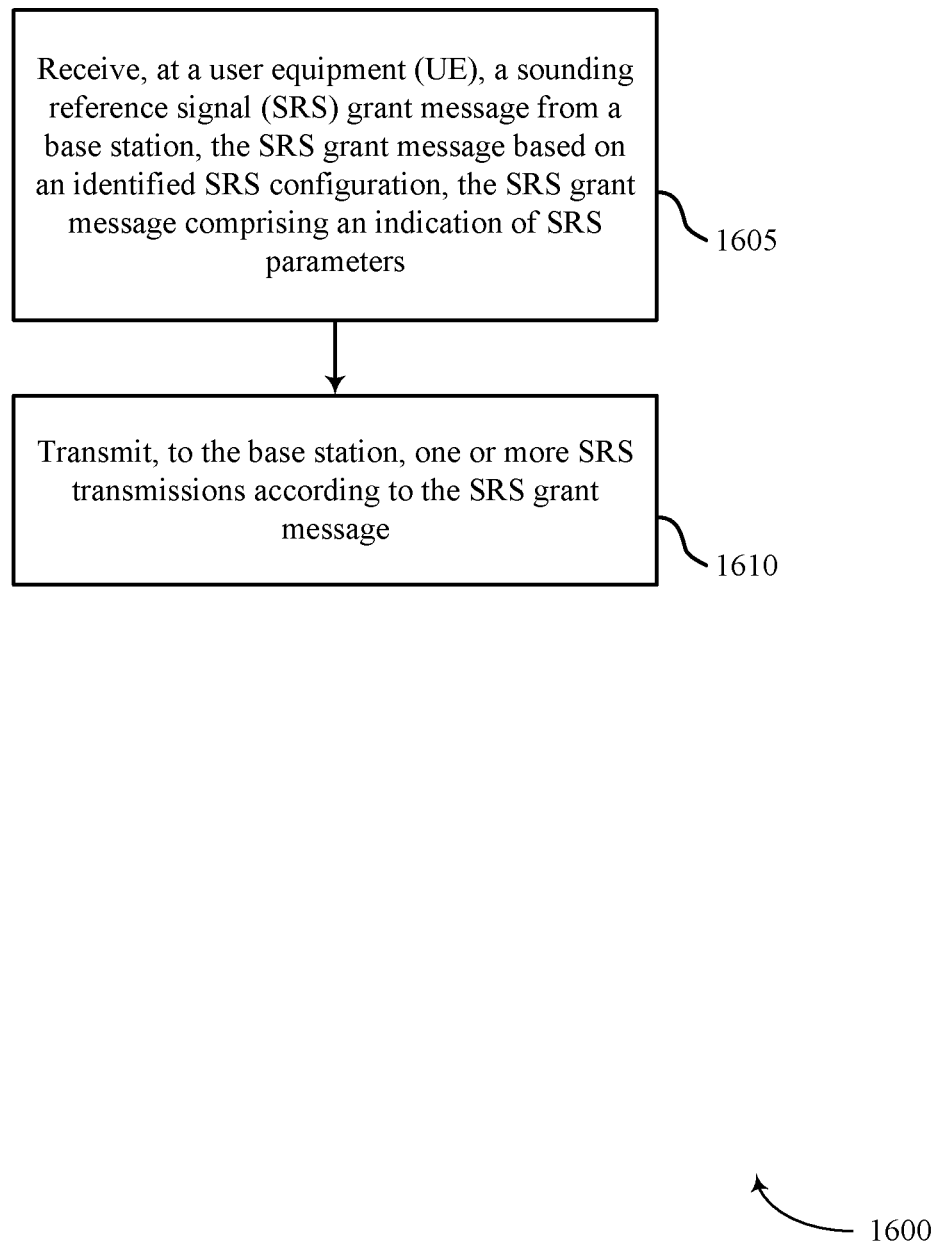
FIGS. 16, 17, 19, 20, 23, and 24 illustrate methods in accordance with aspects of the present disclosure.

FIG. 16 shows a flowchart illustrating a method 1600 for claims in accordance with various aspects of the present disclosure. The operations of method 1600 may be implemented by a device such as a UE 115 or its components as described with reference to FIGS. 1 and 2. For example, the operations of method 1600 may be performed by the UE SRS manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive an SRS grant message from a base station, the SRS grant message based on an identified SRS configuration, the SRS grant message comprising an indication of SRS parameters as described above with reference to FIGS. 2 through 11. In certain examples, the operations of block 1605 may be performed by the SRS grant component as described with reference to FIGS. 13 and 14.

At block 1610, the UE 115 may transmit, to the base station, one or more SRS transmissions according to the SRS grant message as described above with reference to FIGS. 2 through 11. In certain examples, the operations of block 1610 may be performed by the SRS component as described with reference to FIGS. 13 and 14.

Figure 17:
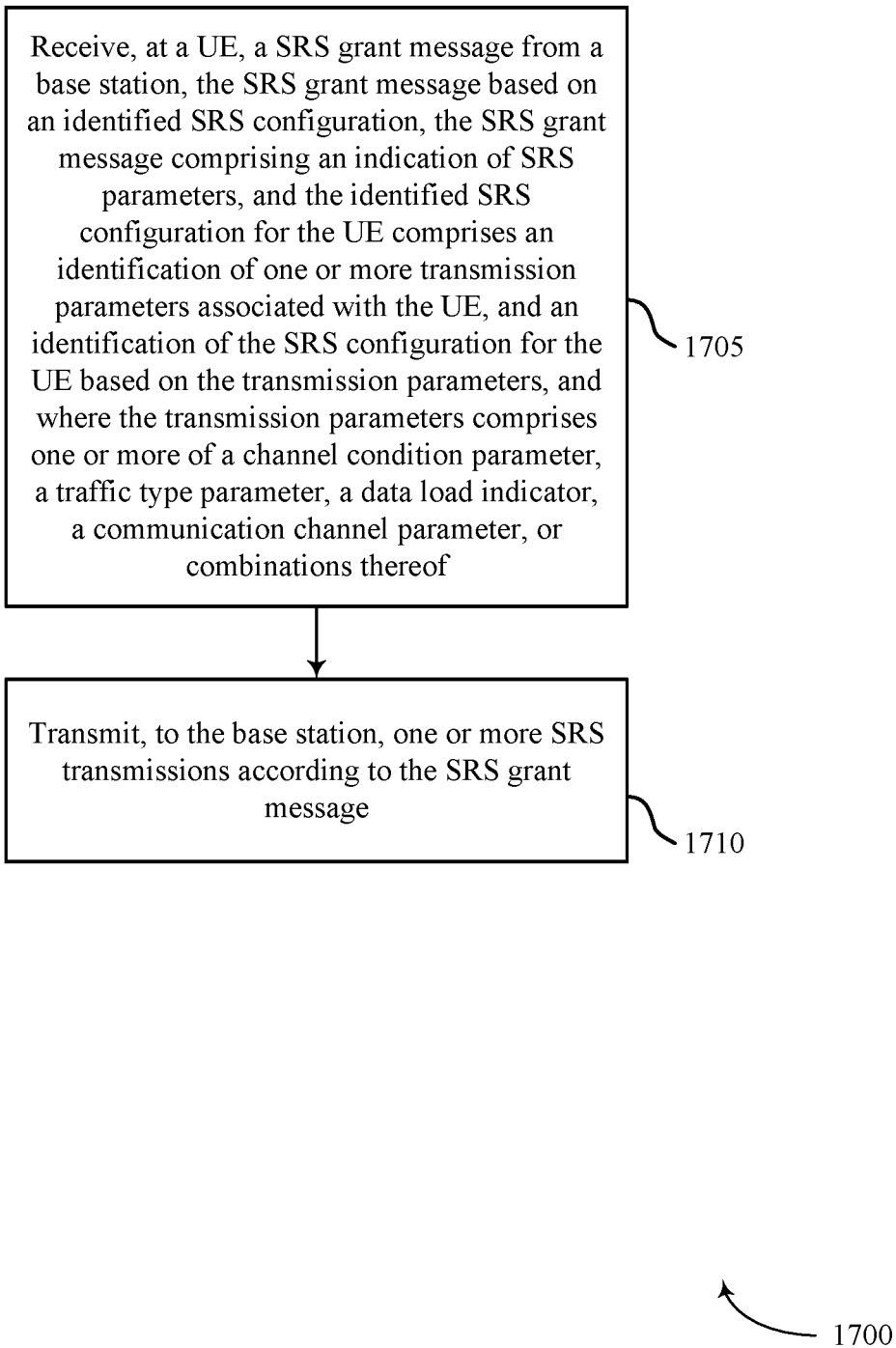

FIG. 17 shows a flowchart illustrating a method 1700 for claims in accordance with various aspects of the present disclosure. The operations of method 1700 may be implemented by a device such as a UE 115 or its components as described with reference to FIGS. 1 and 2. For example, the operations of method 1700 may be performed by the UE SRS manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive a SRS grant message from a base station, the SRS grant message based on an identified SRS configuration, the SRS grant message comprising an indication of SRS parameters as described above with reference to FIGS. 2 through 11. In some cases, the identified SRS configuration for the UE comprises an identification of one or more transmission parameters associated with the UE, and an identification of the SRS configuration for the UE based on the transmission parameters. In some cases, the transmission parameters comprises one or more of a channel condition parameter, a traffic type parameter, a data load indicator, a communication channel parameter, or combinations thereof. In certain examples, the operations of block 1705 may be performed by the SRS grant component as described with reference to FIGS. 13 and 14.

At block 1710, the UE 115 may transmit, to the base station, one or more SRS transmissions according to the SRS grant message as described above with reference to FIGS. 2 through 11. In certain examples, the operations of block 1710 may be performed by the SRS component as described with reference to FIGS. 13 and 14.

Figure 19:
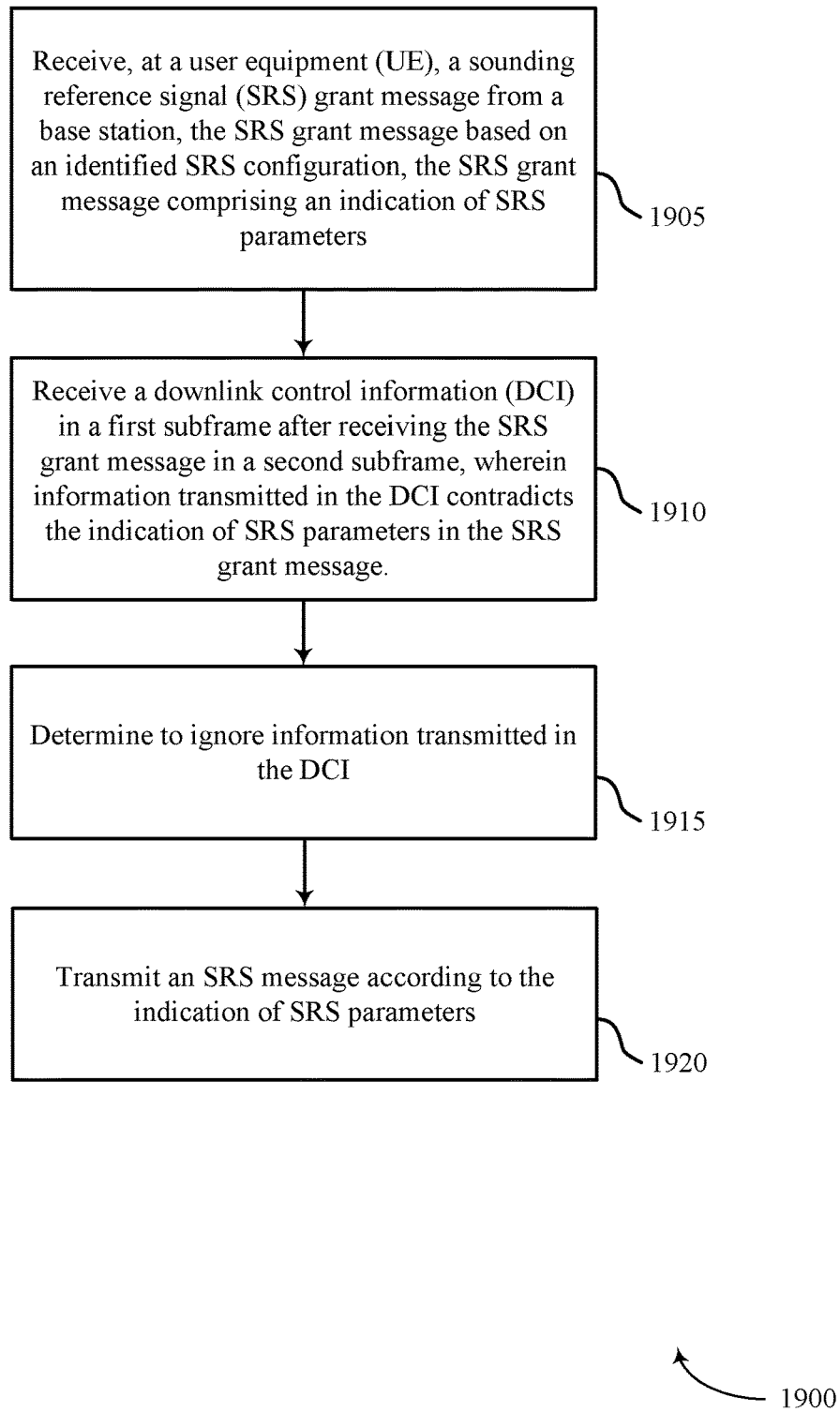

FIG. 19 shows a flowchart illustrating a method 1900 for claims in accordance with various aspects of the present disclosure. The operations of method 1900 may be implemented by a device such as a UE 115 or its components as described with reference to FIGS. 1 and 2. For example, the operations of method 1900 may be performed by the UE SRS manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may receive an SRS grant message from a base station, the SRS grant message based on an identified SRS configuration, the SRS grant message comprising an indication of SRS parameters as described above with reference to FIGS. 2 through 11 and 18. In certain examples, the operations of block 1905 may be performed by the SRS grant component as described with reference to FIGS. 13 and 14.

At block 1910, the UE 115 may receive a DCI in a first subframe after receiving the SRS grant message in a second subframe, wherein information transmitted in the DCI contradicts the indication of SRS parameters in the SRS grant message, as described above with reference to FIGS. 2 through 11 and 18. In certain examples, the operations of block 1910 may be performed by the SRS component as described with reference to FIGS. 13 and 14. In some cases, the ordering of blocks 1905 and 1910 may be reversed.

At block 1915, the UE 115 may determine to ignore information transmitted in the DCI, as described above with reference to FIGS. 2 through 11 and 18. In certain examples, the operations of block 1915 may be performed by the SRS component as described with reference to FIGS. 13 and 14.

At block 1920, the UE 115 may transmit, to the base station, an SRS message according to the indication of SRS parameters as described above with reference to FIGS. 2 through 11 and 18. In certain examples, the operations of block 1920 may be performed by the SRS component as described with reference to FIGS. 13 and 14.

Figure 20:
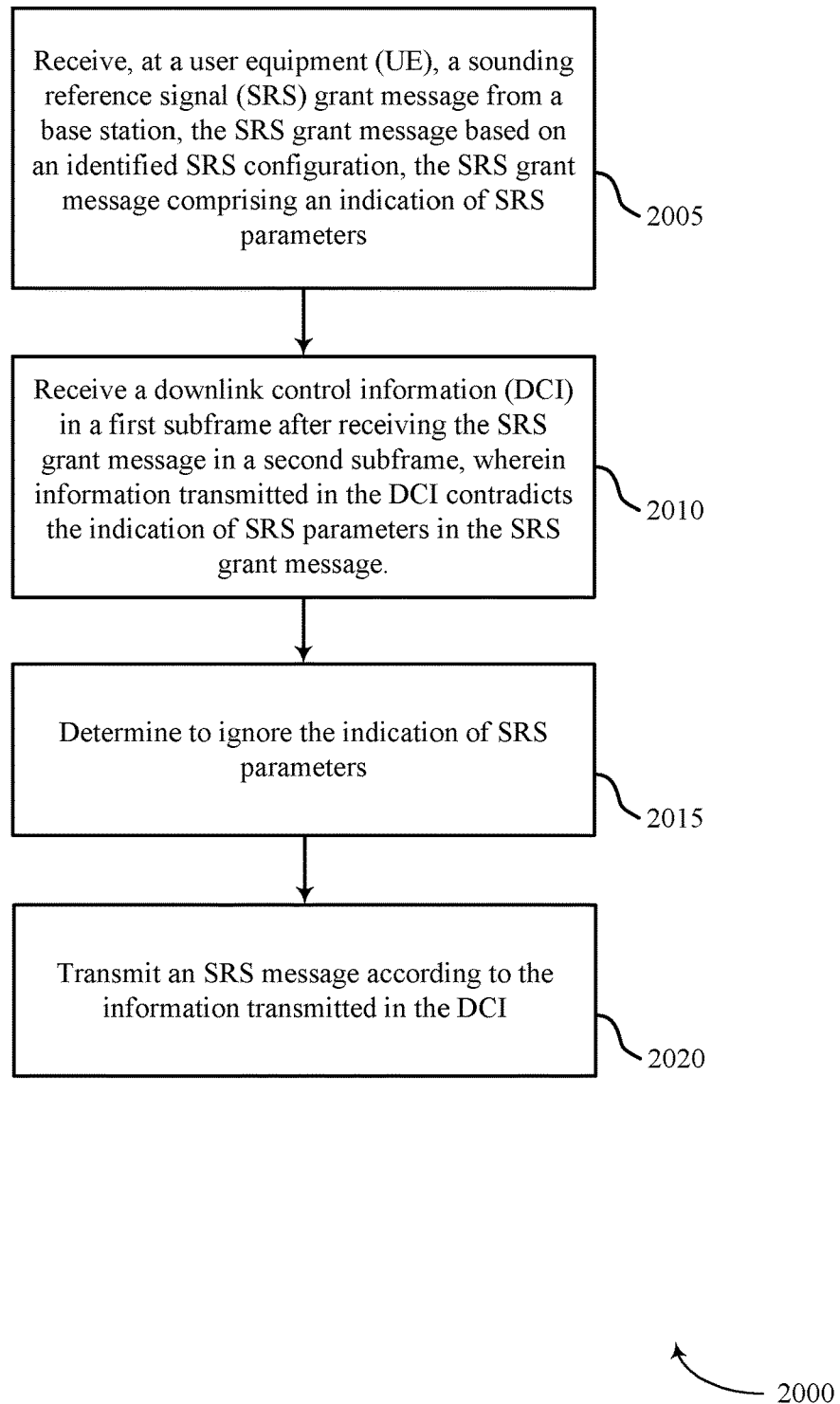

FIG. 20 shows a flowchart illustrating a method 2000 for claims in accordance with various aspects of the present disclosure. The operations of method 2000 may be implemented by a device such as a UE 115 or its components as described with reference to FIGS. 1 and 2. For example, the operations of method 2000 may be performed by the UE SRS manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may receive an SRS grant message from a base station, the SRS grant message based on an identified SRS configuration, the SRS grant message comprising an indication of SRS parameters as described above with reference to FIGS. 2 through 11 and 18. In certain examples, the operations of block 2005 may be performed by the SRS grant component as described with reference to FIGS. 13 and 14.

At block 2010, the UE 115 may receive a DCI in a first subframe after receiving the SRS grant message in a second subframe, wherein information transmitted in the DCI contradicts the indication of SRS parameters in the SRS grant message, as described above with reference to FIGS. 2 through 11 and 18. In certain examples, the operations of block 2010 may be performed by the SRS component as described with reference to FIGS. 13 and 14. In some cases, the ordering of blocks 2005 and 2010 may be reversed.

At block 2015, the UE 115 may determine to ignore the indication of SRS parameters, as described above with reference to FIGS. 2 through 11 and 18. In certain examples, the operations of block 2015 may be performed by the SRS component as described with reference to FIGS. 13 and 14.

At block 2020, the UE 115 may transmit, to the base station, an SRS message according to the information transmitted in the DCI, as described above with reference to FIGS. 2 through 11 and 18. In certain examples, the operations of block 2020 may be performed by the SRS component as described with reference to FIGS. 13 and 14.

Figure 23:
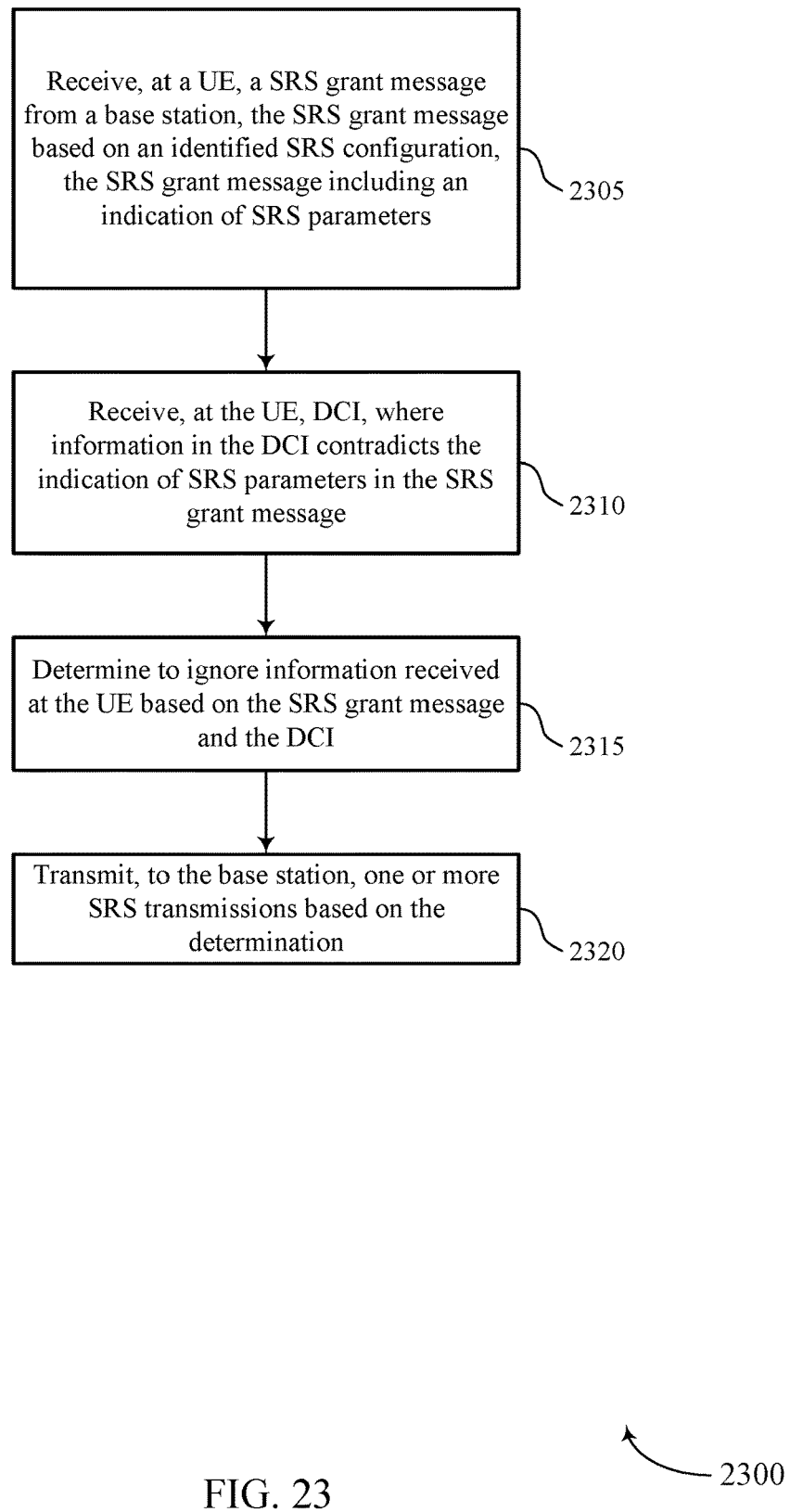

FIG. 23 shows a flowchart illustrating a method 2300 for Dynamic Sounding Reference Signal Scheduling in accordance with various aspects of the present disclosure. The operations of method 2300 may be implemented by a UE 115 or its components as described herein. For example, the operations of method 2300 may be performed by a SRS manager as described with reference to FIG. 6. In some examples, a UE 115 may execute a set of codes to control the functional elements of the device to perform the functions described below. Additionally or alternatively, the UE 115 may perform aspects the functions described below using special-purpose hardware.

At block 2305 the UE 115 may receive, at a UE, a SRS grant message from a base station, the SRS grant message based at least in part on an identified SRS configuration, the SRS grant message comprising an indication of SRS parameters. The operations of block 2305 may be performed according to the methods described with reference to FIGS. 1 and 2. In certain examples, aspects of the operations of block 2305 may be performed by the SRS component as described with reference to FIGS. 13 and 14.

At block 2310 the UE 115 may receive DCI, at the UE, wherein information in the DCI contradicts the indication of SRS parameters in the SRS grant message. The operations of block 2310 may be performed according to the methods described with reference to FIGS. 1 and 2. In certain examples, aspects of the operations of block 2310 may be performed by the SRS component as described with reference to FIGS. 13 and 14.

At block 2315 the UE 115 may determine to ignore information received at the UE based at least in part on the SRS grant message and the DCI. The operations of block 2315 may be performed according to the methods described with reference to FIGS. 1 and 2. In certain examples, aspects of the operations of block 2315 may be performed by the SRS component as described with reference to FIGS. 13 and 14.

At block 2320 the UE 115 may transmit, to the base station, one or more SRS transmissions based at least in part on the determination. The operations of block 2320 may be performed according to the methods described with reference to FIGS. 1 and 2. In certain examples, aspects of the operations of block 2320 may be performed by the SRS component as described with reference to FIGS. 13 and 14.

Figure 24:
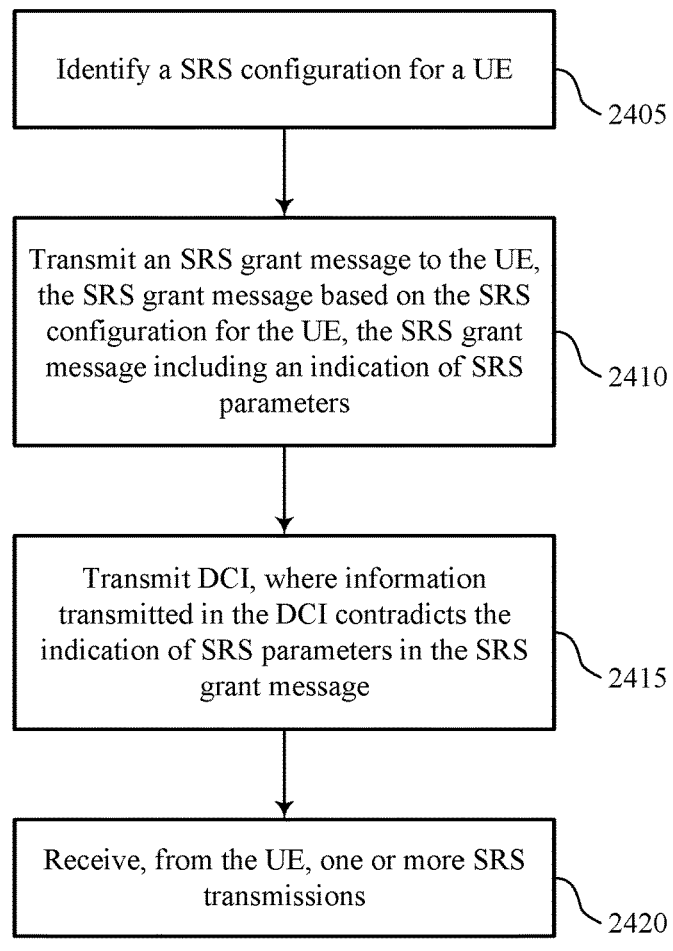

FIG. 24 shows a flowchart illustrating a method 2400 for Dynamic Sounding Reference Signal Scheduling in accordance with various aspects of the present disclosure. The operations of method 2400 may be implemented by a base station 105 or its components as described herein. For example, the operations of method 2400 may be performed by a SRS manager as described with reference to FIGS. 6 through 8. In some examples, a base station 105 may execute a set of codes to control the functional elements of the device to perform the functions described below. Additionally or alternatively, the base station 105 may perform aspects the functions described below using special-purpose hardware.

At block 2405 the base station 105 may identify a SRS configuration for a UE. The operations of block 2405 may be performed according to the methods described with reference to FIGS. 1 and 2. In certain examples, aspects of the operations of block 2405 may be performed by the SRS grant component as described with reference to FIGS. 13 and 14.

At block 2410 the base station 105 may transmit an SRS grant message to the UE, the SRS grant message based at least in part on the SRS configuration for the UE, the SRS grant message comprising an indication of SRS parameters. The operations of block 2410 may be performed according to the methods described with reference to FIGS. 1 and 2. In certain examples, aspects of the operations of block 2410 may be performed by the SRS grant component as described with reference to FIGS. 13 and 14.

At block 2415 the base station 105 may transmit DCI, wherein information transmitted in the DCI contradicts the indication of SRS parameters in the SRS grant message. The operations of block 2415 may be performed according to the methods described with reference to FIGS. 1 and 2. In certain examples, aspects of the operations of block 2415 may be performed by the SRS grant component as described with reference to FIGS. 13 and 14.

At block 2420 the base station 105 may receive, from the UE, one or more SRS transmissions. The operations of block 2420 may be performed according to the methods described with reference to FIGS. 1 and 2. In certain examples, aspects of the operations of block 2420 may be performed by the SRS grant component as described with reference to FIGS. 13 and 14.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for dynamic sounding reference signal scheduling.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for dynamic sounding reference signal scheduling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication, comprising:
   receiving, at a user equipment (UE), a sounding reference signal (SRS) grant message from a base station, the SRS grant message comprising an indication of SRS parameters;
   receiving, at the UE, downlink control information (DCI);
   determining to ignore information received at the UE based at least in part on information in the DCI contradicting the indication of SRS parameters in the SRS grant message; and
   transmitting, to the base station, one or more physical uplink control channel IPUCCH) transmissions according to the DCI based at least in part on the determination.

2. The method of claim 1, wherein determining to ignore information further comprises:
   determining to ignore information transmitted in the DCI and follow information transmitted in the SRS grant message based at least in part on the information in the DCI contradicting the indication of SRS parameters in the SRS grant message, and wherein transmitting one or more uplink transmissions comprises transmitting an SRS message according to the indication of SRS parameters.

3. The method of claim 1, wherein determining to ignore information further comprises:
   determining to ignore information transmitted in the SRS grant message and follow information transmitted in the DCI based at least in part on the information in the DCI contradicting the indication of SRS parameters in the SRS grant message, and wherein transmitting one or more uplink transmissions comprises transmitting an SRS message according to the DCI.

4. The method of claim 1, wherein:
   the DCI is received in a subframe before the SRS grant message is received.

5. The method of claim 1, wherein:
   the DCI is received in a subframe after the SRS grant message is received.

6. The method of claim 1, wherein:
   the DCI is received in a same subframe as the SRS grant message.

7. The method of claim 1, wherein:
   the SRS grant message is received in a second DCI.

8. The method of claim 1, wherein:
   the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

9. The method of claim 1, wherein:
the SRS parameters comprise one or more of a repetition parameter associated with the one or more SRS transmissions, a starting position pointer associated with the one or more SRS transmissions, an occupied bandwidth parameter associated with the one or more SRS transmissions, a symbol index value associated with the one or more SRS transmissions, an UE antenna port indication associated with the one or more SRS transmissions, an UE antenna subarray indication associated with the one or more SRS transmissions, a UE beam indication associated with the one or more SRS transmissions, a cyclic shift parameter associated with the one or more SRS transmissions, a comb offset parameter associated with the one or more SRS transmissions, or combinations thereof.

10. A method for wireless communication, comprising:
transmitting an SRS grant message to the UE, the SRS grant message comprising an indication of SRS parameters;
transmitting downlink control information (DCI), wherein information in the DCI contradicts the indication of SRS parameters in the SRS grant message; and
receiving, from the UE, one or more physical uplink control channel (PUCCH) transmissions according to the DCI based at least in part on the information in the DCI contradicting the indication of SRS parameters in the SRS grant message.

11. The method of claim 10, wherein:
the DCI is transmitted in a subframe before the SRS grant message is transmitted.

12. The method of claim 10, wherein:
the DCI is transmitted in a subframe after the SRS grant message is transmitted.

13. The method of claim 10, wherein:
the DCI is transmitted in a same subframe as the SRS grant message.

14. The method of claim 10, further comprising:
receiving an SRS message according to the indication of SRS parameters in the SRS grant message.

15. The method of claim 10, further comprising:
receiving an SRS message according to information transmitted in the DCI.

16. The method of claim 10, wherein:
the SRS grant message is transmitted in a second DCI.

17. The method of claim 10, wherein:
the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

18. The method of claim 10, wherein:
the SRS parameters comprise one or more of a repetition parameter associated with the one or more SRS transmissions, a starting position pointer associated with the one or more SRS transmissions, an occupied bandwidth parameter associated with the one or more SRS transmissions, a symbol index value associated with the one or more SRS transmissions, an UE antenna port indication associated with the one or more SRS transmissions, an UE antenna subarray indication associated with the one or more SRS transmissions, a UE beam indication associated with the one or more SRS transmissions, a cyclic shift parameter associated with the one or more SRS transmissions, a comb offset parameter associated with the one or more SRS transmissions, or combinations.

19. An apparatus for wireless communication, in a system comprising:
a processor;
memory in electronic communication with the processor; and
instructions stored in the memory and operable, when executed by the processor, to cause the apparatus to:
receive, at a user equipment (UE), a sounding reference signal (SRS) grant message from a base station, the SRS grant message comprising an indication of SRS parameters;
receive, at the UE, downlink control information (DCI);
determine to ignore information received at the UE based at least in part on information in the DCI contradicting the indication of SRS parameters in the SRS grant message; and
transmit, to the base station, one or more physical uplink control channel (PUCCH) transmissions according to the DCI based at least in part on the determination.

20. The apparatus of claim 19, wherein the instructions to determine to ignore information are further executable by the processor to:
determine to ignore information transmitted in the DCI and follow information transmitted in the SRS grant message based at least in part on the information in the DCI contradicting the indication of SRS parameters in the SRS grant message, and wherein transmitting one or more uplink transmissions comprises transmitting an SRS message according to the indication of SRS parameters.

21. The apparatus of claim 19, wherein the instructions to determine to ignore information are further executable by the processor to:
determine to ignore information transmitted in the SRS grant message and follow information transmitted in the DCI based at least in part on the information in the DCI contradicting the indication of SRS parameters in the SRS grant message, and wherein transmitting one or more uplink transmissions comprises transmitting an SRS message according to the DCI.

22. The apparatus of claim 19, wherein:
the DCI is received in a subframe before the SRS grant message is received.

23. The apparatus of claim 19, wherein:
the DCI is received in a subframe after the SRS grant message is received.

24. The apparatus of claim 19, wherein:
the DCI is received in a same subframe as the SRS grant message.

25. The apparatus of claim 19, wherein:
the SRS grant message is received in a second DCI.

26. The apparatus of claim 19, wherein:
the information transmitted in the DCI that contradicts the indication of SRS parameters in the SRS grant message comprises one or more of a subframe index associated with the one or more SRS transmissions, an occupied bandwidth parameter associated with the one or more SRS transmissions, a symbol index value associated with the one or more SRS transmissions, a base station antenna port associated with the one or more SRS transmissions, a user equipment (UE) antenna port indication associated with the one or more SRS transmissions, a cyclic shift parameter associated with the one or more SRS transmissions, a comb offset parameter associated with the one or more SRS transmissions, or a combination thereof.

27. The apparatus of claim 19, wherein:
the SRS parameters comprise one or more of a repetition parameter associated with the one or more SRS transmissions, a starting position pointer associated with the one or more SRS transmissions, an occupied bandwidth parameter associated with the one or more SRS transmissions, a symbol index value associated with the one or more SRS transmissions, an UE antenna port indication associated with the one or more SRS transmissions, an UE antenna subarray indication associated with the one or more SRS transmissions, a UE beam indication associated with the one or more SRS transmissions, a cyclic shift parameter associated with the one or more SRS transmissions, a comb offset parameter associated with the one or more SRS transmissions, or combinations thereof.

28. An apparatus for wireless communication, in a system comprising:
   a processor;
   memory in electronic communication with the processor; and
   instructions stored in the memory and operable, when executed by the processor, to cause the apparatus to:
   transmit an SRS grant message to the UE, the SRS grant message comprising an indication of SRS parameters;
   transmit downlink control information (DCI), wherein information in the DCI contradicts the indication of SRS parameters in the SRS grant message; and
   receive, from the UE, one or more physical uplink control channel (PUCCH) transmissions according to the DCI based at least in part on the information in the DCI contradicting the indication of SRS parameters in the SRS grant message.

29. The method of claim 1, wherein the information transmitted in the DCI that contradicts the indication of SRS parameters in the SRS grant message comprises a base station antenna port associated with the one or more SRS transmissions.

* * * * *